United States Patent
Varaprasad et al.

(10) Patent No.: US 10,544,329 B2
(45) Date of Patent: Jan. 28, 2020

(54) POLYSILOXANE FORMULATIONS AND COATINGS FOR OPTOELECTRONIC APPLICATIONS

(71) Applicant: Honeywell International Inc., Morris Plains, NJ (US)

(72) Inventors: Desaraju Varaprasad, Dublin, CA (US); Sudip Mukhopadhyay, Berkeley, CA (US); Songyuan Xie, E. Palo Alto, CA (US); Amanuel H. Gebrehrhan, San Jose, CA (US); Hai Bien, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/522,419

(22) PCT Filed: Mar. 2, 2016

(86) PCT No.: PCT/US2016/020373
§ 371 (c)(1),
(2) Date: Apr. 27, 2017

(87) PCT Pub. No.: WO2016/167892
PCT Pub. Date: Oct. 20, 2016

(65) Prior Publication Data
US 2018/0022957 A1 Jan. 25, 2018

Related U.S. Application Data

(60) Provisional application No. 62/146,593, filed on Apr. 13, 2015.

(51) Int. Cl.
C09D 183/04 (2006.01)
C08J 3/24 (2006.01)

(52) U.S. Cl.
CPC .............. *C09D 183/04* (2013.01); *C08J 3/24* (2013.01); *C08J 2383/04* (2013.01); *C08J 2483/04* (2013.01)

(58) Field of Classification Search
None
See application file for complete search history.

(56) References Cited

U.S. PATENT DOCUMENTS

| 31,987 A | 4/1861 | Light |
|---|---|---|
| 35,239 A | 5/1862 | Jacobs |

(Continued)

FOREIGN PATENT DOCUMENTS

| CN | 102566278 B | 7/2012 |
|---|---|---|
| CN | 104177619 A | 12/2014 |

(Continued)

OTHER PUBLICATIONS

International Search Report and Written Opinion issued in PCT/US2016/020373, dated Jun. 17, 2016, 9 pages.

(Continued)

*Primary Examiner* — Robert S Loewe
(74) *Attorney, Agent, or Firm* — Faegre Baker Daniels LLP

(57) ABSTRACT

A crosslinkable composition includes a first silicon-containing resin comprising alkyl groups and alkyl groups and a second silicon-containing resin comprising alkyl groups. The first silicon-containing resin has a weight average molecular weight from 1000 AMU to 10,000 AMU. The second silicon-containing resin has a weight average molecular weight from 900 AMU to 5000 AMU. The composition further includes at least one solvent and at least one heat-activated catalyst.

20 Claims, 8 Drawing Sheets

(56) References Cited

U.S. PATENT DOCUMENTS

| | | |
|---|---|---|
| 35,368 A | 5/1862 | Ehrman |
| 35,447 A | 6/1862 | Howard |
| 58,929 A | 10/1866 | Wood |
| 106,376 A | 8/1870 | Lerch |
| 172,896 A | 2/1876 | Stebins |
| 677,386 A | 7/1901 | Teeguarden et al. |
| 2,783,263 A | 2/1957 | Merker |
| 2,986,548 A | 5/1961 | McLoughlin |
| 3,294,737 A | 12/1966 | Krantz |
| 3,615,272 A | 10/1971 | Collins et al. |
| 3,635,529 A | 1/1972 | Nass |
| 3,647,508 A | 3/1972 | Gorrell |
| 3,784,378 A | 1/1974 | Gramas |
| 3,873,361 A | 3/1975 | Franco et al. |
| 3,884,702 A | 5/1975 | Koshimo et al. |
| 3,925,077 A | 12/1975 | Lewis et al. |
| 3,929,489 A | 12/1975 | Arcesi et al. |
| 4,018,606 A | 4/1977 | Contois et al. |
| 4,018,607 A | 4/1977 | Contois |
| 4,043,812 A | 8/1977 | Stolka et al. |
| 4,048,146 A | 9/1977 | Wilson |
| 4,052,367 A | 10/1977 | Wilson |
| 4,053,313 A | 10/1977 | Fan |
| 4,102,683 A | 7/1978 | DiPiazza |
| 4,191,571 A | 3/1980 | Nonogaki et al. |
| 4,257,826 A | 3/1981 | Matalone, Jr. |
| 4,290,896 A | 9/1981 | Gordon et al. |
| 4,299,938 A | 11/1981 | Green et al. |
| 4,308,371 A | 12/1981 | Tanaka et al. |
| 4,312,970 A | 1/1982 | Gaul, Jr. |
| 4,328,262 A | 5/1982 | Kurahashi et al. |
| 4,348,471 A | 9/1982 | Shelnut et al. |
| 4,349,609 A | 9/1982 | Takeda et al. |
| 4,351,935 A | 9/1982 | Reesink et al. |
| 4,362,809 A | 12/1982 | Chen et al. |
| 4,363,859 A | 12/1982 | Sasaki et al. |
| 4,369,284 A | 1/1983 | Chen |
| 4,388,449 A | 6/1983 | Bonnet et al. |
| 4,399,255 A | 8/1983 | Smith et al. |
| 4,399,266 A | 8/1983 | Matsumura et al. |
| 4,413,052 A | 11/1983 | Green et al. |
| 4,413,088 A | 11/1983 | Frye |
| 4,419,437 A | 12/1983 | Noonan et al. |
| 4,423,135 A | 12/1983 | Chen et al. |
| 4,430,153 A | 2/1984 | Gleason et al. |
| 4,434,127 A | 2/1984 | Baile |
| 4,442,197 A | 4/1984 | Crivello et al. |
| 4,456,679 A | 6/1984 | Leyrer et al. |
| 4,483,107 A | 11/1984 | Tomoyori et al. |
| 4,510,283 A | 4/1985 | Takeda et al. |
| 4,513,132 A | 4/1985 | Shoji et al. |
| 4,515,828 A | 5/1985 | Economy et al. |
| 4,546,017 A | 10/1985 | Flackett et al. |
| 4,557,996 A | 12/1985 | Aoyama et al. |
| 4,563,241 A | 1/1986 | Tanaka et al. |
| 4,587,138 A | 5/1986 | Yau et al. |
| 4,594,309 A | 6/1986 | Guillet |
| 4,595,599 A | 6/1986 | Brown et al. |
| 4,600,685 A | 7/1986 | Kitakohji et al. |
| 4,603,168 A | 7/1986 | Sasaki et al. |
| 4,609,614 A | 9/1986 | Pampalone et al. |
| 4,617,252 A | 10/1986 | Cordes, III et al. |
| 4,618,213 A | 10/1986 | Chen |
| 4,620,986 A | 11/1986 | Yau et al. |
| 4,624,912 A | 11/1986 | Zweifel et al. |
| 4,626,556 A | 12/1986 | Nozue et al. |
| 4,657,843 A | 4/1987 | Fukuyama et al. |
| 4,657,965 A | 4/1987 | Watanabe et al. |
| 4,663,414 A | 5/1987 | Estes et al. |
| 4,670,299 A | 6/1987 | Fukuyama et al. |
| 4,674,176 A | 6/1987 | Tuckerman |
| 4,676,867 A | 6/1987 | Elkins et al. |
| 4,678,835 A | 7/1987 | Chang et al. |
| 4,681,795 A | 7/1987 | Tuckerman |
| 4,687,216 A | 8/1987 | Kawamoto et al. |
| 4,693,959 A | 9/1987 | Ashcraft |
| 4,702,990 A | 10/1987 | Tanaka et al. |
| 4,705,729 A | 11/1987 | Sheats |
| 4,705,739 A | 11/1987 | Fisch |
| 4,708,925 A | 11/1987 | Newman |
| 4,723,978 A | 2/1988 | Clodgo et al. |
| 4,731,264 A | 3/1988 | Lin et al. |
| 4,732,858 A | 3/1988 | Brewer et al. |
| 4,745,169 A | 5/1988 | Sugiyama et al. |
| 4,746,693 A | 5/1988 | Meder |
| 4,752,649 A | 6/1988 | Neckers |
| 4,753,855 A | 6/1988 | Haluska et al. |
| 4,756,977 A | 7/1988 | Haluska et al. |
| 4,762,767 A | 8/1988 | Haas et al. |
| 4,763,966 A | 8/1988 | Suzuki et al. |
| 4,767,571 A | 8/1988 | Suzuki et al. |
| 4,774,141 A | 9/1988 | Matsui et al. |
| 4,778,624 A | 10/1988 | Ohashi et al. |
| 4,782,009 A | 11/1988 | Bolon et al. |
| 4,783,347 A | 11/1988 | Doin et al. |
| 4,806,504 A | 2/1989 | Cleeves |
| 4,808,553 A | 2/1989 | Yamazaki |
| 4,814,578 A | 3/1989 | Tuckerman |
| 4,816,049 A | 3/1989 | Hata et al. |
| 4,822,697 A | 4/1989 | Haluska et al. |
| 4,822,718 A | 4/1989 | Latham et al. |
| 4,826,943 A | 5/1989 | Ito et al. |
| 4,831,188 A | 5/1989 | Neckers |
| 4,839,274 A | 6/1989 | Logan |
| 4,839,427 A | 6/1989 | Mormile |
| 4,847,152 A | 7/1989 | Jabs et al. |
| 4,847,162 A | 7/1989 | Haluska et al. |
| 4,849,296 A | 7/1989 | Haluska et al. |
| 4,855,199 A | 8/1989 | Bolon et al. |
| 4,863,827 A | 9/1989 | Jain et al. |
| 4,863,829 A | 9/1989 | Furuta et al. |
| 4,863,833 A | 9/1989 | Fukuyama et al. |
| 4,876,165 A | 10/1989 | Brewer et al. |
| 4,885,262 A | 12/1989 | Ting et al. |
| 4,895,914 A | 1/1990 | Saitoh et al. |
| 4,898,907 A | 2/1990 | Haluska et al. |
| 4,904,721 A | 2/1990 | Hanaoka et al. |
| 4,910,122 A | 3/1990 | Arnold et al. |
| 4,911,992 A | 3/1990 | Haluska et al. |
| 4,913,846 A | 4/1990 | Suzuki et al. |
| 4,921,317 A | 5/1990 | Suzuki et al. |
| 4,921,778 A | 5/1990 | Thackeray et al. |
| 4,923,638 A | 5/1990 | Ohno et al. |
| 4,925,772 A | 5/1990 | Quella et al. |
| 4,926,383 A | 5/1990 | Kertis et al. |
| 4,927,732 A | 5/1990 | Merrem et al. |
| 4,935,320 A | 6/1990 | Rohde et al. |
| 4,935,583 A | 6/1990 | Kyle |
| 4,940,651 A | 7/1990 | Brown et al. |
| 4,942,083 A | 7/1990 | Smith, Jr. |
| 4,943,511 A | 7/1990 | Lazarus et al. |
| 4,950,577 A | 8/1990 | Grieve et al. |
| 4,950,583 A | 8/1990 | Brewer et al. |
| 4,954,414 A | 9/1990 | Adair et al. |
| 4,962,996 A | 10/1990 | Cuellar et al. |
| 4,970,134 A | 11/1990 | Bronstert et al. |
| 4,973,510 A | 11/1990 | Tanaka |
| 4,973,526 A | 11/1990 | Haluska |
| 4,981,530 A | 1/1991 | Clodgo et al. |
| 4,981,778 A | 1/1991 | Brault |
| 4,988,514 A | 1/1991 | Fukuyama et al. |
| 4,999,397 A | 3/1991 | Weiss et al. |
| 5,004,660 A | 4/1991 | Van Andel et al. |
| 5,008,320 A | 4/1991 | Haluska et al. |
| 5,009,669 A | 4/1991 | Jollenbeck et al. |
| 5,009,809 A | 4/1991 | Kosin et al. |
| 5,009,810 A | 4/1991 | Wason et al. |
| 5,013,608 A | 5/1991 | Guest et al. |
| 5,024,923 A | 6/1991 | Suzuki et al. |
| 5,026,624 A | 6/1991 | Day et al. |
| 5,034,189 A | 7/1991 | Cox et al. |
| 5,037,580 A | 8/1991 | Garcia et al. |
| 5,043,789 A | 8/1991 | Linde et al. |
| 5,045,570 A | 9/1991 | Mooney et al. |

(56) References Cited

U.S. PATENT DOCUMENTS

| | | |
|---|---|---|
| 5,045,592 A | 9/1991 | Weiss et al. |
| 5,049,414 A | 9/1991 | Kato |
| 5,055,372 A | 10/1991 | Shanklin et al. |
| 5,055,376 A | 10/1991 | Saeva |
| 5,059,448 A | 10/1991 | Chandra et al. |
| 5,059,500 A | 10/1991 | Needham et al. |
| 5,063,134 A | 11/1991 | Horiguchi et al. |
| 5,063,267 A | 11/1991 | Hanneman et al. |
| 5,077,085 A | 12/1991 | Schnur et al. |
| 5,079,600 A | 1/1992 | Schnur et al. |
| 5,100,503 A | 3/1992 | Allman et al. |
| 5,102,695 A | 4/1992 | Guest et al. |
| 5,104,692 A | 4/1992 | Belmares |
| 5,106,534 A | 4/1992 | Wason et al. |
| 5,112,728 A | 5/1992 | Tanji et al. |
| 5,116,637 A | 5/1992 | Baney et al. |
| 5,116,715 A | 5/1992 | Roland et al. |
| 5,126,289 A | 6/1992 | Ziger |
| 5,137,655 A | 8/1992 | Kosin et al. |
| 5,140,396 A | 8/1992 | Needham et al. |
| 5,152,834 A | 10/1992 | Allman |
| 5,153,254 A | 10/1992 | Chen |
| 5,166,093 A | 11/1992 | Grief |
| 5,173,368 A | 12/1992 | Belmares |
| 5,179,185 A | 1/1993 | Yamamoto et al. |
| 5,194,364 A | 3/1993 | Abe et al. |
| 5,199,979 A | 4/1993 | Lin et al. |
| 5,212,046 A | 5/1993 | Lamola et al. |
| 5,212,218 A | 5/1993 | Rinehart |
| 5,219,788 A | 6/1993 | Abernathey et al. |
| 5,227,334 A | 7/1993 | Sandhu |
| 5,236,984 A | 8/1993 | Yamamoto et al. |
| 5,239,723 A | 8/1993 | Chen |
| 5,250,224 A | 10/1993 | Wason et al. |
| 5,252,340 A | 10/1993 | Honeycutt |
| 5,252,618 A | 10/1993 | Garcia et al. |
| 5,256,510 A | 10/1993 | Bugner et al. |
| 5,262,201 A | 11/1993 | Chandra et al. |
| 5,262,468 A | 11/1993 | Chen |
| 5,271,768 A | 12/1993 | Morishima et al. |
| 5,272,026 A | 12/1993 | Roland et al. |
| 5,272,042 A | 12/1993 | Allen et al. |
| 5,278,010 A | 1/1994 | Day et al. |
| 5,300,402 A | 4/1994 | Card, Jr. et al. |
| 5,302,198 A | 4/1994 | Allman |
| 5,302,455 A | 4/1994 | Wason et al. |
| 5,302,849 A | 4/1994 | Cavasin |
| 5,317,044 A | 5/1994 | Mooney et al. |
| 5,320,868 A | 6/1994 | Ballance et al. |
| 5,324,222 A | 6/1994 | Chen |
| 5,324,591 A | 6/1994 | Georger, Jr. et al. |
| 5,328,975 A | 7/1994 | Hanson et al. |
| 5,334,646 A | 8/1994 | Chen |
| 5,336,708 A | 8/1994 | Chen |
| 5,340,644 A | 8/1994 | Babcock et al. |
| 5,359,022 A | 10/1994 | Mautner et al. |
| 5,360,692 A | 11/1994 | Kawabe et al. |
| 5,380,621 A | 1/1995 | Dichiara et al. |
| 5,382,615 A | 1/1995 | Godfrey |
| 5,384,357 A | 1/1995 | Levinson et al. |
| 5,387,480 A | 2/1995 | Haluska et al. |
| 5,389,496 A | 2/1995 | Calvert et al. |
| 5,391,463 A | 2/1995 | Ligler et al. |
| 5,395,734 A | 3/1995 | Vogel et al. |
| 5,396,311 A | 3/1995 | Fukushima et al. |
| 5,401,614 A | 3/1995 | Dichiara et al. |
| 5,403,680 A | 4/1995 | Otagawa et al. |
| 5,414,069 A | 5/1995 | Cumming et al. |
| 5,417,977 A | 5/1995 | Honeycutt |
| 5,418,136 A | 5/1995 | Miller et al. |
| 5,432,007 A | 7/1995 | Naito |
| 5,439,766 A | 8/1995 | Day et al. |
| 5,439,872 A | 8/1995 | Ito et al. |
| 5,441,765 A | 8/1995 | Ballance et al. |
| 5,449,639 A | 9/1995 | Wei et al. |
| 5,449,712 A | 9/1995 | Gierke et al. |
| 5,455,145 A | 10/1995 | Tarumoto |
| 5,455,208 A | 10/1995 | Leung et al. |
| 5,457,081 A | 10/1995 | Takiguchi et al. |
| 5,458,982 A | 10/1995 | Godfrey |
| 5,467,626 A | 11/1995 | Sanders |
| 5,468,591 A | 11/1995 | Pearce et al. |
| 5,472,488 A | 12/1995 | Allman |
| 5,475,890 A | 12/1995 | Chen |
| 5,482,817 A | 1/1996 | Dichiara et al. |
| 5,498,345 A | 3/1996 | Jollenbeck et al. |
| 5,498,468 A | 3/1996 | Blaney |
| 5,498,748 A | 3/1996 | Urano et al. |
| 5,500,315 A | 3/1996 | Calvert et al. |
| 5,508,334 A | 4/1996 | Chen |
| 5,510,628 A | 4/1996 | Georger, Jr. et al. |
| 5,512,418 A | 4/1996 | Ma |
| 5,518,818 A | 5/1996 | Kidai et al. |
| 5,520,855 A | 5/1996 | Ito et al. |
| 5,523,163 A | 6/1996 | Ballance et al. |
| 5,527,562 A | 6/1996 | Balaba et al. |
| 5,527,872 A | 6/1996 | Allman |
| 5,552,260 A | 9/1996 | Vogel et al. |
| 5,554,485 A | 9/1996 | Dichiara et al. |
| 5,576,144 A | 11/1996 | Pearce et al. |
| 5,576,247 A | 11/1996 | Yano et al. |
| 5,576,359 A | 11/1996 | Urano et al. |
| 5,578,318 A | 11/1996 | Honeycutt |
| 5,580,606 A | 12/1996 | Kai |
| 5,580,819 A | 12/1996 | Li et al. |
| 5,583,195 A | 12/1996 | Eckberg |
| 5,597,408 A | 1/1997 | Choi |
| 5,624,294 A | 4/1997 | Chen |
| 5,629,437 A | 5/1997 | Linder et al. |
| 5,635,240 A | 6/1997 | Haluska et al. |
| 5,638,724 A | 6/1997 | Sanders |
| 5,648,201 A | 7/1997 | Dulcey et al. |
| 5,655,947 A | 8/1997 | Chen |
| 5,661,196 A | 8/1997 | Mayer et al. |
| 5,661,992 A | 9/1997 | Sanders |
| 5,662,109 A | 9/1997 | Hutson |
| 5,663,286 A | 9/1997 | Ahmed et al. |
| 5,665,845 A | 9/1997 | Allman |
| 5,670,295 A | 9/1997 | Namba et al. |
| 5,672,243 A | 9/1997 | Hsia et al. |
| 5,674,624 A | 10/1997 | Miyazaki et al. |
| 5,674,648 A | 10/1997 | Brewer et al. |
| 5,677,112 A | 10/1997 | Urano et al. |
| 5,679,128 A | 10/1997 | Latting et al. |
| 5,683,095 A | 11/1997 | Astier et al. |
| 5,693,691 A | 12/1997 | Flaim et al. |
| 5,693,701 A | 12/1997 | Camilletti et al. |
| 5,695,551 A | 12/1997 | Buckingham et al. |
| 5,695,910 A | 12/1997 | Urano et al. |
| 5,707,883 A | 1/1998 | Tabara |
| 5,719,249 A | 2/1998 | Fujita et al. |
| 5,729,563 A | 3/1998 | Wang et al. |
| 5,731,091 A | 3/1998 | Schmidt et al. |
| 5,741,623 A | 4/1998 | Namba et al. |
| 5,744,243 A | 4/1998 | Li et al. |
| 5,744,244 A | 4/1998 | Camilletti et al. |
| 5,747,223 A | 5/1998 | Allen et al. |
| 5,747,553 A | 5/1998 | Guzauskas |
| 5,750,292 A | 5/1998 | Sato et al. |
| 5,755,867 A | 5/1998 | Chikuni et al. |
| 5,756,257 A | 5/1998 | Landgrebe et al. |
| 5,759,625 A | 6/1998 | Laubacher et al. |
| 5,760,117 A | 6/1998 | Chen |
| 5,767,014 A | 6/1998 | Hawker et al. |
| 5,773,170 A | 6/1998 | Patel et al. |
| 5,776,559 A | 7/1998 | Woolford |
| 5,780,206 A | 7/1998 | Urano et al. |
| 5,786,125 A | 7/1998 | Tsuchiya et al. |
| 5,800,926 A | 9/1998 | Nogami et al. |
| 5,837,568 A | 11/1998 | Yoneda et al. |
| 5,837,801 A | 11/1998 | Yahata et al. |
| 5,840,821 A | 11/1998 | Nakano et al. |
| 5,843,617 A | 12/1998 | Patel et al. |
| 5,851,730 A | 12/1998 | Thackeray et al. |

(56) References Cited

U.S. PATENT DOCUMENTS

| | | |
|---|---|---|
| 5,851,738 A | 12/1998 | Thackeray et al. |
| 5,853,808 A | 12/1998 | Arkles et al. |
| 5,855,960 A | 1/1999 | Ohnishi et al. |
| 5,858,547 A | 1/1999 | Drage |
| 5,868,597 A | 2/1999 | Chen |
| 5,873,931 A | 2/1999 | Scholz et al. |
| 5,877,228 A | 3/1999 | Mine et al. |
| 5,883,011 A | 3/1999 | Lin et al. |
| 5,884,639 A | 3/1999 | Chen |
| 5,905,109 A | 5/1999 | Shimizu et al. |
| 5,910,021 A | 6/1999 | Tabara |
| 5,922,299 A | 7/1999 | Bruinsma et al. |
| 5,929,159 A | 7/1999 | Schutt et al. |
| 5,935,758 A | 8/1999 | Patel et al. |
| 5,938,499 A | 8/1999 | Chen |
| 5,939,236 A | 8/1999 | Pavelchek et al. |
| 5,939,510 A | 8/1999 | Sato et al. |
| 5,944,431 A | 8/1999 | Becker et al. |
| 5,945,172 A | 8/1999 | Yamaya et al. |
| 5,945,249 A | 8/1999 | Patel et al. |
| 5,948,600 A | 9/1999 | Roschger et al. |
| 5,949,518 A | 9/1999 | Belmares et al. |
| 5,953,627 A | 9/1999 | Carter et al. |
| 5,962,067 A | 10/1999 | Bautista et al. |
| 5,962,572 A | 10/1999 | Chen |
| 5,964,917 A | 10/1999 | Latting |
| 5,965,305 A | 10/1999 | Ligler et al. |
| 5,972,616 A | 10/1999 | O'Brien et al. |
| 5,976,666 A | 11/1999 | Narang et al. |
| 5,981,675 A | 11/1999 | Valint, Jr. et al. |
| 5,985,444 A | 11/1999 | Olson et al. |
| 5,986,344 A | 11/1999 | Subramanion et al. |
| 5,994,431 A | 11/1999 | Olson et al. |
| 5,997,621 A | 12/1999 | Scholz et al. |
| 5,998,300 A | 12/1999 | Tabara |
| 5,998,522 A | 12/1999 | Nakano et al. |
| 6,008,350 A | 12/1999 | Roschger et al. |
| 6,020,410 A | 2/2000 | Hacker et al. |
| 6,022,812 A | 2/2000 | Smith et al. |
| 6,025,077 A | 2/2000 | Yamaki et al. |
| 6,033,283 A | 3/2000 | Chen |
| 6,037,275 A | 3/2000 | Wu et al. |
| 6,040,053 A | 3/2000 | Scholz et al. |
| 6,040,251 A | 3/2000 | Caldwell |
| 6,042,994 A | 3/2000 | Yang et al. |
| 6,043,330 A | 3/2000 | Hacker et al. |
| 6,043,547 A | 3/2000 | Hsia et al. |
| 6,048,804 A | 4/2000 | Smith et al. |
| 6,050,871 A | 4/2000 | Chen |
| 6,051,310 A | 4/2000 | Cano et al. |
| 6,057,239 A | 5/2000 | Wang et al. |
| 6,072,018 A | 6/2000 | Wilkes et al. |
| 6,074,695 A | 6/2000 | Kobayashi et al. |
| 6,087,068 A | 7/2000 | Sato et al. |
| 6,090,448 A | 7/2000 | Wallace et al. |
| 6,096,460 A | 8/2000 | French et al. |
| 6,103,456 A | 8/2000 | Tobben et al. |
| 6,103,770 A | 8/2000 | Trouve |
| 6,103,779 A | 8/2000 | Guzauskas |
| 6,107,167 A | 8/2000 | Bhakta |
| 6,117,176 A | 9/2000 | Chen |
| 6,117,360 A | 9/2000 | Miyazawa et al. |
| 6,124,369 A | 9/2000 | Kudo et al. |
| 6,126,733 A | 10/2000 | Wallace et al. |
| 6,137,175 A | 10/2000 | Tabara |
| 6,137,634 A | 10/2000 | Li |
| 6,140,254 A | 10/2000 | Endisch et al. |
| 6,143,855 A | 11/2000 | Hacker et al. |
| 6,144,083 A | 11/2000 | Yin |
| 6,147,407 A | 11/2000 | Jin et al. |
| 6,148,830 A | 11/2000 | Chen |
| 6,149,778 A | 11/2000 | Jin et al. |
| 6,149,934 A | 11/2000 | Krzysik et al. |
| 6,149,966 A | 11/2000 | Kobayashi et al. |
| 6,150,250 A | 11/2000 | Tabara et al. |
| 6,150,440 A | 11/2000 | Olson et al. |
| 6,152,906 A | 11/2000 | Faulks et al. |
| 6,161,555 A | 12/2000 | Chen |
| 6,165,697 A | 12/2000 | Thackeray et al. |
| 6,166,163 A | 12/2000 | Kudo et al. |
| 6,171,766 B1 | 1/2001 | Patel et al. |
| 6,174,631 B1 | 1/2001 | French et al. |
| 6,174,977 B1 | 1/2001 | Ariyoshi et al. |
| 6,177,199 B1 | 1/2001 | Hacker et al. |
| 6,177,360 B1 | 1/2001 | Carter et al. |
| 6,180,025 B1 | 1/2001 | Schoenfeld et al. |
| 6,180,317 B1 | 1/2001 | Allen et al. |
| 6,187,505 B1 | 2/2001 | Lin et al. |
| 6,187,689 B1 | 2/2001 | Tabara |
| 6,190,830 B1 | 2/2001 | Leon et al. |
| 6,190,839 B1 | 2/2001 | Pavelchek et al. |
| 6,190,955 B1 | 2/2001 | Ilg et al. |
| 6,191,030 B1 | 2/2001 | Subramanian et al. |
| 6,194,121 B1 | 2/2001 | Namba et al. |
| 6,194,534 B1 | 2/2001 | Baumann et al. |
| 6,204,202 B1 | 3/2001 | Leung et al. |
| 6,208,041 B1 | 3/2001 | Majumdar et al. |
| 6,210,862 B1 | 4/2001 | Day et al. |
| 6,214,104 B1 | 4/2001 | Iida et al. |
| 6,217,890 B1 | 4/2001 | Paul et al. |
| 6,218,020 B1 | 4/2001 | Hacker et al. |
| 6,218,497 B1 | 4/2001 | Hacker et al. |
| 6,225,033 B1 | 5/2001 | Onishi et al. |
| 6,225,671 B1 | 5/2001 | Yin |
| 6,231,989 B1 | 5/2001 | Chung et al. |
| 6,232,424 B1 | 5/2001 | Zhong et al. |
| 6,235,456 B1 | 5/2001 | Ibok |
| 6,238,379 B1 | 5/2001 | Keuhn, Jr. et al. |
| 6,238,838 B1 | 5/2001 | Gaschler et al. |
| 6,251,486 B1 | 6/2001 | Chandross et al. |
| 6,255,671 B1 | 7/2001 | Bojarczuk, Jr. et al. |
| 6,261,676 B1 | 7/2001 | Olson et al. |
| 6,261,743 B1 | 7/2001 | Pavelchek et al. |
| 6,268,108 B1 | 7/2001 | Iguchi et al. |
| 6,268,294 B1 | 7/2001 | Jang et al. |
| 6,268,457 B1 | 7/2001 | Kennedy et al. |
| 6,271,273 B1 | 8/2001 | You et al. |
| 6,277,750 B1 | 8/2001 | Pawlowski et al. |
| 6,280,911 B1 | 8/2001 | Trefonas, III |
| 6,284,428 B1 | 9/2001 | Hirosaki et al. |
| 6,287,286 B1 | 9/2001 | Akin et al. |
| 6,291,143 B1 | 9/2001 | Patel et al. |
| 6,291,586 B2 | 9/2001 | Lasch et al. |
| 6,296,862 B1 | 10/2001 | Paul et al. |
| 6,306,736 B1 | 10/2001 | Alivisatos et al. |
| 6,313,045 B1 | 11/2001 | Zhong et al. |
| 6,313,257 B1 | 11/2001 | Abbey |
| 6,315,946 B1 | 11/2001 | Focht |
| 6,316,013 B1 | 11/2001 | Paul et al. |
| 6,316,160 B1 | 11/2001 | Shao et al. |
| 6,316,165 B1 | 11/2001 | Pavelchek et al. |
| 6,318,124 B1 | 11/2001 | Pavelchek et al. |
| 6,319,855 B1 | 11/2001 | Hendricks et al. |
| 6,323,268 B1 | 11/2001 | Fisher et al. |
| 6,324,703 B1 | 12/2001 | Chen |
| 6,326,231 B1 | 12/2001 | Subramanian et al. |
| 6,329,117 B1 | 12/2001 | Padmanaban et al. |
| 6,329,118 B1 | 12/2001 | Hussein et al. |
| 6,333,374 B1 | 12/2001 | Chen |
| 6,335,234 B2 | 1/2002 | Wu et al. |
| 6,335,235 B1 | 1/2002 | Bhakta et al. |
| 6,337,089 B1 | 1/2002 | Yoshioka et al. |
| 6,340,735 B1 | 1/2002 | Yagihashi |
| 6,342,249 B1 | 1/2002 | Wong et al. |
| 6,344,284 B1 | 2/2002 | Chou |
| 6,344,305 B1 | 2/2002 | Lin et al. |
| 6,348,240 B1 | 2/2002 | Calvert et al. |
| 6,350,818 B1 | 2/2002 | Hong et al. |
| 6,352,931 B1 | 3/2002 | Seta et al. |
| 6,358,294 B1 | 3/2002 | Latting |
| 6,358,559 B1 | 3/2002 | Hacker et al. |
| 6,359,096 B1 | 3/2002 | Zhong et al. |
| 6,359,099 B1 | 3/2002 | Hacker et al. |
| 6,361,820 B1 | 3/2002 | Hacker et al. |

(56) References Cited

U.S. PATENT DOCUMENTS

| | | |
|---|---|---|
| 6,365,266 B1 | 4/2002 | MacDougall et al. |
| 6,365,529 B1 | 4/2002 | Hussein et al. |
| 6,365,765 B1 | 4/2002 | Baldwin et al. |
| 6,368,400 B1 | 4/2002 | Baldwin et al. |
| 6,368,681 B1 | 4/2002 | Ogawa |
| 6,374,738 B1 | 4/2002 | Lewis et al. |
| 6,380,621 B1 | 4/2002 | Ando et al. |
| 6,383,466 B1 | 5/2002 | Domansky et al. |
| 6,387,519 B1 | 5/2002 | Anderson et al. |
| 6,391,524 B2 | 5/2002 | Yates et al. |
| 6,399,269 B2 | 6/2002 | Mizutani et al. |
| 6,403,464 B1 | 6/2002 | Chang |
| 6,409,883 B1 | 6/2002 | Makolin et al. |
| 6,410,150 B1 | 6/2002 | Kurosawa et al. |
| 6,410,209 B1 | 6/2002 | Adams et al. |
| 6,413,647 B1 | 7/2002 | Hayashi et al. |
| 6,420,088 B1 | 7/2002 | Angelopoulos et al. |
| 6,420,441 B1 | 7/2002 | Allen et al. |
| 6,420,475 B1 | 7/2002 | Chen |
| 6,426,125 B1 | 7/2002 | Yang et al. |
| 6,432,191 B2 | 8/2002 | Schutt |
| 6,433,037 B1 | 8/2002 | Guzauskas |
| 6,441,452 B2 | 8/2002 | Yin |
| 6,444,584 B1 | 9/2002 | Hsiao |
| 6,448,185 B1 | 9/2002 | Andideh et al. |
| 6,448,331 B1 | 9/2002 | Ioka et al. |
| 6,448,464 B1 | 9/2002 | Akin et al. |
| 6,451,503 B1 | 9/2002 | Thackeray et al. |
| 6,455,207 B1 | 9/2002 | Katoh et al. |
| 6,455,416 B1 | 9/2002 | Subramanian et al. |
| 6,456,358 B1 | 9/2002 | Lu |
| 6,461,717 B1 | 10/2002 | Rutter et al. |
| 6,461,970 B1 | 10/2002 | Yin |
| 6,465,358 B1 | 10/2002 | Nashner et al. |
| 6,465,889 B1 | 10/2002 | Subramanian et al. |
| 6,472,012 B2 | 10/2002 | Nakada et al. |
| 6,472,128 B2 | 10/2002 | Thackeray et al. |
| 6,475,892 B1 | 11/2002 | Bhakta |
| 6,485,368 B2 | 11/2002 | Jones et al. |
| 6,488,394 B1 | 12/2002 | Mabe et al. |
| 6,491,840 B1 | 12/2002 | Frankenbach et al. |
| 6,492,441 B2 | 12/2002 | Hong et al. |
| 6,495,264 B2 | 12/2002 | Hayashi et al. |
| 6,497,893 B1 | 12/2002 | Everhart et al. |
| 6,503,233 B1 | 1/2003 | Chen et al. |
| 6,503,413 B2 | 1/2003 | Uchiyama et al. |
| 6,503,525 B1 | 1/2003 | Paul et al. |
| 6,503,526 B1 | 1/2003 | Krzysik et al. |
| 6,503,586 B1 | 1/2003 | Wu et al. |
| 6,503,692 B2 | 1/2003 | Angelopoulos et al. |
| 6,504,525 B1 | 1/2003 | Knights |
| 6,505,362 B1 | 1/2003 | Scipio |
| 6,506,497 B1 | 1/2003 | Kennedy et al. |
| 6,509,259 B1 | 1/2003 | Wang et al. |
| 6,509,279 B2 | 1/2003 | Fujii et al. |
| 6,512,071 B1 | 1/2003 | Hacker et al. |
| 6,514,677 B1 | 2/2003 | Ramsden et al. |
| 6,515,073 B2 | 2/2003 | Sakamoto et al. |
| 6,517,951 B2 | 2/2003 | Hacker et al. |
| 6,528,235 B2 | 3/2003 | Thackeray et al. |
| 6,541,107 B1 | 4/2003 | Zhong et al. |
| 6,544,717 B2 | 4/2003 | Hirosaki et al. |
| 6,548,113 B1 | 4/2003 | Birnbaum et al. |
| 6,552,109 B1 | 4/2003 | Chen |
| 6,558,363 B2 | 5/2003 | Keuhn, Jr. et al. |
| 6,558,880 B1 | 5/2003 | Goswami et al. |
| 6,559,070 B1 | 5/2003 | Mandal |
| 6,562,192 B1 | 5/2003 | Hamilton et al. |
| 6,565,813 B1 | 5/2003 | Garyantes |
| 6,566,479 B1 | 5/2003 | Bublewitz et al. |
| 6,573,175 B1 | 6/2003 | Yin et al. |
| 6,573,328 B2 | 6/2003 | Kropp et al. |
| 6,576,382 B2 | 6/2003 | Day et al. |
| 6,576,408 B2 | 6/2003 | Meador et al. |
| 6,576,651 B2 | 6/2003 | Bandyopadhyay et al. |
| 6,582,861 B2 | 6/2003 | Buxbaum et al. |
| 6,587,147 B1 | 7/2003 | Li |
| 6,589,862 B2 | 7/2003 | Wang et al. |
| 6,592,980 B1 | 7/2003 | MacDougall et al. |
| 6,592,999 B1 | 7/2003 | Anderson et al. |
| 6,593,388 B2 | 7/2003 | Crivello |
| 6,596,314 B2 | 7/2003 | Wong et al. |
| 6,596,404 B1 | 7/2003 | Albaugh et al. |
| 6,596,467 B2 | 7/2003 | Gallagher et al. |
| 6,599,995 B2 | 7/2003 | Hwang et al. |
| 6,602,552 B1 | 8/2003 | Daraskevich et al. |
| 6,602,652 B2 | 8/2003 | Adams et al. |
| 6,605,359 B2 | 8/2003 | Robinson et al. |
| 6,605,360 B2 | 8/2003 | Kizaki et al. |
| 6,605,362 B2 | 8/2003 | Baldwin et al. |
| 6,605,542 B2 | 8/2003 | Seta et al. |
| 6,607,991 B1 | 8/2003 | Livesay et al. |
| 6,610,457 B2 | 8/2003 | Kim et al. |
| 6,612,828 B2 | 9/2003 | Powers et al. |
| 6,613,834 B2 | 9/2003 | Nakata et al. |
| 6,617,257 B2 | 9/2003 | Ni et al. |
| 6,617,609 B2 | 9/2003 | Kelley et al. |
| 6,623,791 B2 | 9/2003 | Sadvary et al. |
| 6,627,275 B1 | 9/2003 | Chen |
| 6,632,535 B1 | 10/2003 | Buazza et al. |
| 6,635,281 B2 | 10/2003 | Wong et al. |
| 6,635,341 B1 | 10/2003 | Barancyk et al. |
| 6,645,685 B2 | 11/2003 | Takata et al. |
| 6,645,881 B2 | 11/2003 | Yamada et al. |
| 6,649,212 B2 | 11/2003 | Payne et al. |
| 6,649,534 B2 | 11/2003 | Fujii et al. |
| 6,649,741 B1 | 11/2003 | O'Brien et al. |
| 6,652,766 B1 | 11/2003 | Frankenbach et al. |
| 6,653,049 B2 | 11/2003 | Pavelchek et al. |
| 6,655,946 B2 | 12/2003 | Foreman et al. |
| 6,664,199 B2 | 12/2003 | Fujii et al. |
| 6,667,424 B1 | 12/2003 | Hamilton et al. |
| 6,670,284 B2 | 12/2003 | Yin |
| 6,673,982 B1 | 1/2004 | Chen et al. |
| 6,674,106 B2 | 1/2004 | Tanaka et al. |
| 6,676,398 B2 | 1/2004 | Foreman et al. |
| 6,676,740 B2 | 1/2004 | Matsumura et al. |
| 6,677,392 B2 | 1/2004 | Ravichandran et al. |
| 6,678,026 B2 | 1/2004 | Maeda et al. |
| 6,689,932 B2 | 2/2004 | Kruchoski et al. |
| 6,696,538 B2 | 2/2004 | Ko et al. |
| 6,699,647 B2 | 3/2004 | Lynch et al. |
| 6,702,564 B2 | 3/2004 | Foreman et al. |
| 6,703,169 B2 | 3/2004 | Fuller et al. |
| 6,703,462 B2 | 3/2004 | Lee |
| 6,709,257 B2 | 3/2004 | Foreman et al. |
| 6,712,331 B2 | 3/2004 | Foreman et al. |
| 6,716,566 B2 | 4/2004 | Aoshima |
| 6,717,181 B2 | 4/2004 | Murakami et al. |
| 6,720,125 B2 | 4/2004 | Nakamura et al. |
| 6,726,463 B2 | 4/2004 | Foreman |
| 6,730,454 B2 | 5/2004 | Pfeiffer et al. |
| 6,730,461 B2 | 5/2004 | Hunt et al. |
| 6,737,121 B2 | 5/2004 | Yang et al. |
| 6,740,685 B2 | 5/2004 | Li et al. |
| 6,743,856 B1 | 6/2004 | Hacker et al. |
| 6,749,765 B2 | 6/2004 | Rutter et al. |
| 6,749,860 B2 | 6/2004 | Tyrrell et al. |
| 6,750,308 B2 | 6/2004 | Andoh et al. |
| 6,752,613 B2 | 6/2004 | Foreman |
| 6,756,103 B2 | 6/2004 | Thompson et al. |
| 6,756,124 B2 | 6/2004 | Kanamori et al. |
| 6,756,520 B1 | 6/2004 | Krzysik et al. |
| 6,758,663 B2 | 7/2004 | Foreman et al. |
| 6,767,689 B2 | 7/2004 | Pavelchek et al. |
| 6,770,726 B1 | 8/2004 | Arkles et al. |
| 6,773,861 B2 | 8/2004 | Takashima et al. |
| 6,773,864 B1 | 8/2004 | Thackeray et al. |
| 6,776,094 B1 | 8/2004 | Whitesides et al. |
| 6,777,092 B1 | 8/2004 | Hayashi et al. |
| 6,780,498 B2 | 8/2004 | Nakata et al. |
| 6,783,468 B2 | 8/2004 | Sullivan et al. |
| 6,787,281 B2 | 9/2004 | Tao et al. |
| 6,790,024 B2 | 9/2004 | Foreman |

(56) References Cited

U.S. PATENT DOCUMENTS

| | | | |
|---|---|---|---|
| 6,794,440 | B2 | 9/2004 | Chen |
| 6,797,343 | B2 | 9/2004 | Lee |
| 6,800,330 | B2 | 10/2004 | Hayashi et al. |
| 6,803,034 | B2 | 10/2004 | DuVal et al. |
| 6,803,168 | B1 | 10/2004 | Padmanaban et al. |
| 6,803,476 | B2 | 10/2004 | Rantala et al. |
| 6,808,381 | B2 | 10/2004 | Foreman et al. |
| 6,812,551 | B2 | 11/2004 | Hawker et al. |
| 6,818,289 | B2 | 11/2004 | MacDougall et al. |
| 6,819,049 | B1 | 11/2004 | Bohmer et al. |
| 6,824,879 | B2 | 11/2004 | Baldwin et al. |
| 6,824,952 | B1 | 11/2004 | Minsek et al. |
| 6,825,303 | B2 | 11/2004 | Lee |
| 6,831,189 | B2 | 12/2004 | Rantala et al. |
| 6,832,064 | B2 | 12/2004 | Simpson et al. |
| 6,838,182 | B2 | 1/2005 | Kropp et al. |
| 6,840,752 | B2 | 1/2005 | Foreman et al. |
| 6,844,131 | B2 | 1/2005 | Oberlander et al. |
| 6,846,614 | B2 | 1/2005 | Timpe et al. |
| 6,849,209 | B2 | 2/2005 | Minami et al. |
| 6,849,373 | B2 | 2/2005 | Pavelchek et al. |
| 6,849,923 | B2 | 2/2005 | Seta et al. |
| 6,852,421 | B2 | 2/2005 | Wayton et al. |
| 6,852,766 | B1 | 2/2005 | DeVoe |
| 6,855,466 | B2 | 2/2005 | Pavelchek et al. |
| 6,864,040 | B2 | 3/2005 | Müller et al. |
| 6,867,253 | B1 | 3/2005 | Chen |
| 6,869,747 | B2 | 3/2005 | Sabnis et al. |
| 6,875,005 | B2 | 4/2005 | Foreman |
| 6,875,262 | B1 | 4/2005 | Shibuya et al. |
| 6,884,568 | B2 | 4/2005 | Timpe et al. |
| 6,887,644 | B1 | 5/2005 | Nozaki et al. |
| 6,887,648 | B2 | 5/2005 | Pavelchek et al. |
| 6,888,174 | B2 | 5/2005 | Höhn et al. |
| 6,890,448 | B2 | 5/2005 | Pavelchek |
| 6,890,605 | B2 | 5/2005 | Nishikawa et al. |
| 6,890,855 | B2 | 5/2005 | Cotte et al. |
| 6,890,865 | B2 | 5/2005 | Yin et al. |
| 6,891,237 | B1 | 5/2005 | Bao et al. |
| 6,893,245 | B2 | 5/2005 | Foreman et al. |
| 6,893,797 | B2 | 5/2005 | Munnelly et al. |
| 6,896,821 | B2 | 5/2005 | Louellet |
| 6,896,955 | B2 | 5/2005 | Mandal et al. |
| 6,899,988 | B2 | 5/2005 | Kidnie et al. |
| 6,900,000 | B2 | 5/2005 | Sabnis et al. |
| 6,902,771 | B2 | 6/2005 | Shiota et al. |
| 6,902,861 | B2 | 6/2005 | Tao et al. |
| 6,908,722 | B2 | 6/2005 | Ebata et al. |
| 6,909,220 | B2 | 6/2005 | Chen |
| 6,911,514 | B2 | 6/2005 | Bublewitz et al. |
| 6,914,114 | B2 | 7/2005 | Baldwin et al. |
| 6,921,578 | B2 | 7/2005 | Tsujino et al. |
| 6,924,384 | B2 | 8/2005 | Rantala et al. |
| 6,942,083 | B2 | 9/2005 | Barnes et al. |
| 6,942,918 | B2 | 9/2005 | MacDougall et al. |
| 6,956,097 | B2 | 10/2005 | Kennedy et al. |
| 6,962,727 | B2 | 11/2005 | Bedwell et al. |
| 6,969,753 | B2 | 11/2005 | Baldwin et al. |
| 6,974,970 | B2 | 12/2005 | Rantala et al. |
| 6,984,476 | B2 | 1/2006 | Kobayashi et al. |
| 7,001,463 | B2 | 2/2006 | Jones |
| 7,011,889 | B2 | 3/2006 | Bedwell et al. |
| 7,012,125 | B2 | 3/2006 | Kennedy et al. |
| 7,014,982 | B2 | 3/2006 | Thackeray et al. |
| 7,015,061 | B2 | 3/2006 | Lu et al. |
| 7,015,256 | B2 | 3/2006 | Ito et al. |
| 7,018,717 | B2 | 3/2006 | Pavelchek |
| 7,026,053 | B2 | 4/2006 | Shiota et al. |
| 7,026,427 | B2 | 4/2006 | Koehler et al. |
| 7,056,989 | B2 | 6/2006 | Hwang et al. |
| 7,060,634 | B2 | 6/2006 | Rantala et al. |
| 7,074,874 | B2 | 7/2006 | Kobayashi et al. |
| 7,081,272 | B2 | 7/2006 | Sasaki et al. |
| 7,098,346 | B2 | 8/2006 | Rantala et al. |
| 7,109,519 | B2 | 9/2006 | Gerlach |
| 7,119,354 | B2 | 10/2006 | Yagihashi et al. |
| 7,122,880 | B2 | 10/2006 | Peterson et al. |
| 7,128,944 | B2 | 10/2006 | Becker et al. |
| 7,128,976 | B2 | 10/2006 | Hayashi et al. |
| 7,132,473 | B2 | 11/2006 | Ogihara et al. |
| 7,135,064 | B2 | 11/2006 | Shibuya et al. |
| 7,135,223 | B2 | 11/2006 | Tofuku et al. |
| 7,144,827 | B2 | 12/2006 | Rantala et al. |
| 7,153,783 | B2 | 12/2006 | Lu et al. |
| 7,157,503 | B2 | 1/2007 | Wakamura |
| 7,161,019 | B2 | 1/2007 | Rantala et al. |
| 7,163,751 | B2 | 1/2007 | Wayton et al. |
| 7,169,477 | B2 | 1/2007 | Lyu et al. |
| 7,172,913 | B2 | 2/2007 | Lee et al. |
| 7,173,371 | B2 | 2/2007 | Pang et al. |
| 7,173,372 | B2 | 2/2007 | Koo et al. |
| 7,176,493 | B2 | 2/2007 | So et al. |
| 7,176,535 | B2 | 2/2007 | Chae |
| 7,176,994 | B2 | 2/2007 | Maeda et al. |
| 7,177,000 | B2 | 2/2007 | Hu et al. |
| 7,179,673 | B2 | 2/2007 | Song et al. |
| 7,179,757 | B2 | 2/2007 | Ramachandrarao et al. |
| 7,180,090 | B2 | 2/2007 | Chen et al. |
| 7,180,198 | B2 | 2/2007 | Kim |
| 7,180,559 | B2 | 2/2007 | Chang et al. |
| 7,180,563 | B2 | 2/2007 | Kim |
| 7,180,565 | B2 | 2/2007 | Hong et al. |
| 7,189,490 | B2 | 3/2007 | Kanagasabapathy et al. |
| 7,189,663 | B2 | 3/2007 | Bao et al. |
| 7,192,910 | B2 | 3/2007 | Wojtczak et al. |
| 7,198,823 | B2 | 4/2007 | Lee et al. |
| 7,202,013 | B2 | 4/2007 | Ogihara et al. |
| 7,211,365 | B2 | 5/2007 | Barclay et al. |
| 7,244,960 | B2 | 7/2007 | Spreitzer et al. |
| 7,251,404 | B2 | 7/2007 | Shelnut et al. |
| 7,251,405 | B2 | 7/2007 | Shelnut et al. |
| 7,294,585 | B2 | 11/2007 | Peterson et al. |
| 7,297,464 | B2 | 11/2007 | Sakurai et al. |
| 7,303,855 | B2 | 12/2007 | Hatakeyama et al. |
| 7,306,892 | B2 | 12/2007 | Barclay et al. |
| 7,326,442 | B2 | 2/2008 | Babich et al. |
| 7,338,689 | B2 | 3/2008 | Shin et al. |
| 7,358,025 | B2 | 4/2008 | Hatakeyama |
| 7,358,300 | B2 | 4/2008 | Sakurai et al. |
| 7,361,444 | B1 | 4/2008 | Angelopoulos et al. |
| 7,374,812 | B2 | 5/2008 | Mizuno |
| 7,381,441 | B2 | 6/2008 | Leung et al. |
| 7,381,442 | B2 | 6/2008 | Lu et al. |
| 7,425,347 | B2 | 9/2008 | Takei et al. |
| 7,445,953 | B2 | 11/2008 | Lu et al. |
| 7,470,634 | B2 | 12/2008 | Shin et al. |
| 7,517,917 | B2 | 4/2009 | Yim et al. |
| 7,563,844 | B2 | 7/2009 | Osawa et al. |
| 7,575,809 | B2 | 8/2009 | Glaubitt et al. |
| 7,582,360 | B2 | 9/2009 | Wayton et al. |
| 7,582,412 | B2 | 9/2009 | Cameron et al. |
| 7,582,718 | B2 | 9/2009 | Lee et al. |
| 7,595,144 | B2 | 9/2009 | Kishioka et al. |
| 7,598,168 | B2 | 10/2009 | Han et al. |
| 7,645,404 | B2 | 1/2010 | Paar et al. |
| 7,648,894 | B2 | 1/2010 | Moon et al. |
| 7,678,462 | B2 | 3/2010 | Kennedy et al. |
| 7,682,701 | B2 | 3/2010 | Sakurai et al. |
| 7,687,590 | B2 | 3/2010 | Sakurai et al. |
| 7,709,177 | B2 | 5/2010 | Angelopoulos et al. |
| 7,736,833 | B2 | 6/2010 | Angelopoulos et al. |
| 7,820,769 | B2 | 10/2010 | Seifalian et al. |
| 7,855,043 | B2 | 12/2010 | Ogihara et al. |
| 7,915,353 | B2 | 3/2011 | Lee et al. |
| 8,053,159 | B2 | 11/2011 | Li et al. |
| 8,053,173 | B2 | 11/2011 | Lee et al. |
| 8,080,614 | B2 | 12/2011 | Morita et al. |
| 8,101,015 | B2 | 1/2012 | Kennedy et al. |
| 8,188,576 | B2 | 5/2012 | Lee et al. |
| 8,258,502 | B2 | 9/2012 | Yoshitake et al. |
| 8,344,088 | B2 | 1/2013 | Kennedy et al. |
| 8,475,666 | B2 | 7/2013 | Ramos et al. |
| 8,569,792 | B2 | 10/2013 | Mitani et al. |
| 8,652,750 | B2 | 2/2014 | Ogihara et al. |

(56) References Cited

U.S. PATENT DOCUMENTS

| | | |
|---|---|---|
| 8,697,828 B2 | 4/2014 | Li et al. |
| 8,728,710 B2 | 5/2014 | Sun |
| 8,846,828 B2 | 9/2014 | Sagawa et al. |
| 8,859,673 B2 | 10/2014 | Rutter et al. |
| 8,871,425 B2 | 10/2014 | Zhang et al. |
| 8,889,334 B2 | 11/2014 | Kennedy et al. |
| 8,890,139 B2 | 11/2014 | Ahn et al. |
| 8,894,877 B2 | 11/2014 | Detterbeck |
| 8,895,664 B2 | 11/2014 | Ko et al. |
| 8,901,268 B2 | 12/2014 | Krishnamoorthy et al. |
| 8,906,993 B2 | 12/2014 | Sekito et al. |
| 8,911,932 B2 | 12/2014 | Sun |
| 8,916,327 B2 | 12/2014 | Takei et al. |
| 8,927,681 B2 | 1/2015 | Wayton et al. |
| 8,932,702 B2 | 1/2015 | Philips et al. |
| 8,961,918 B2 | 2/2015 | Chang et al. |
| 8,992,806 B2 | 3/2015 | Li et al. |
| 9,069,133 B2 | 6/2015 | Baldwin et al. |
| 9,158,195 B2 | 10/2015 | Karkkainen |
| 2001/0006759 A1 | 7/2001 | Shipley et al. |
| 2001/0024685 A1 | 9/2001 | Boulton et al. |
| 2002/0020327 A1 | 2/2002 | Hayashi et al. |
| 2002/0031729 A1 | 3/2002 | Trefonas et al. |
| 2002/0034626 A1 | 3/2002 | Liu et al. |
| 2002/0034630 A1 | 3/2002 | Cano et al. |
| 2002/0068181 A1 | 6/2002 | Baldwin et al. |
| 2002/0074625 A1 | 6/2002 | Wang et al. |
| 2002/0090519 A1 | 7/2002 | Kursawe et al. |
| 2002/0095018 A1 | 7/2002 | Baldwin et al. |
| 2002/0102396 A1 | 8/2002 | MacDougall et al. |
| 2002/0102417 A1 | 8/2002 | Schutt et al. |
| 2002/0123592 A1 | 9/2002 | Zhang et al. |
| 2002/0127330 A1 | 9/2002 | Jin et al. |
| 2002/0128388 A1 | 9/2002 | Kennedy et al. |
| 2002/0169269 A1 | 11/2002 | Hwang et al. |
| 2002/0192981 A1 | 12/2002 | Fujii et al. |
| 2003/0003176 A1 | 1/2003 | Foreman et al. |
| 2003/0091838 A1 | 5/2003 | Hayashi et al. |
| 2003/0104225 A1 | 6/2003 | Shiota et al. |
| 2003/0105246 A1 | 6/2003 | Andoh et al. |
| 2003/0111748 A1 | 6/2003 | Foreman |
| 2003/0120018 A1 | 6/2003 | Baldwin et al. |
| 2003/0125430 A1 | 7/2003 | Adedeji et al. |
| 2003/0148228 A1 | 8/2003 | Toyoda et al. |
| 2003/0157311 A1 | 8/2003 | MacDougall et al. |
| 2003/0157340 A1 | 8/2003 | Shiota et al. |
| 2003/0157391 A1 | 8/2003 | Coleman et al. |
| 2003/0171729 A1 | 9/2003 | Kaun et al. |
| 2003/0176614 A1 | 9/2003 | Hacker et al. |
| 2003/0191269 A1 | 10/2003 | Ko et al. |
| 2003/0192638 A1 | 10/2003 | Yang et al. |
| 2003/0193624 A1 | 10/2003 | Kobayashi et al. |
| 2003/0198578 A1 | 10/2003 | Lee et al. |
| 2003/0199633 A1 | 10/2003 | Leon et al. |
| 2003/0224611 A1 | 12/2003 | Seta et al. |
| 2003/0227021 A1 | 12/2003 | Yamazaki et al. |
| 2003/0230548 A1 | 12/2003 | Sievert et al. |
| 2004/0020689 A1 | 2/2004 | Kagami et al. |
| 2004/0028915 A1 | 2/2004 | Shibuya et al. |
| 2004/0028918 A1 | 2/2004 | Becker et al. |
| 2004/0067436 A1 | 4/2004 | Kinsho et al. |
| 2004/0067437 A1 | 4/2004 | Wayton et al. |
| 2004/0072420 A1 | 4/2004 | Enomoto et al. |
| 2004/0072436 A1 | 4/2004 | RamachandraRao et al. |
| 2004/0077757 A1 | 4/2004 | Araki et al. |
| 2004/0087184 A1 | 5/2004 | Mandal et al. |
| 2004/0089238 A1 | 5/2004 | Birnbaum et al. |
| 2004/0091811 A1 | 5/2004 | Munnelly et al. |
| 2004/0096666 A1 | 5/2004 | Knox et al. |
| 2004/0110084 A1 | 6/2004 | Inomata et al. |
| 2004/0122197 A1 | 6/2004 | Putzer |
| 2004/0131979 A1 | 7/2004 | Li et al. |
| 2004/0166434 A1 | 8/2004 | Dammel et al. |
| 2004/0180011 A1 | 9/2004 | Schlosser |
| 2004/0180223 A1 | 9/2004 | Shibuya et al. |
| 2004/0201007 A1 | 10/2004 | Yagihashi et al. |
| 2004/0219372 A1 | 11/2004 | Ogihara et al. |
| 2004/0229158 A1 | 11/2004 | Meador et al. |
| 2004/0247900 A1 | 12/2004 | Ogihara et al. |
| 2004/0253461 A1 | 12/2004 | Ogihara et al. |
| 2004/0253532 A1 | 12/2004 | Wu et al. |
| 2004/0253535 A1 | 12/2004 | Cameron et al. |
| 2004/0258929 A1 | 12/2004 | Glaubitt et al. |
| 2005/0003215 A1 | 1/2005 | Hacker et al. |
| 2005/0003681 A1 | 1/2005 | Lyu et al. |
| 2005/0019842 A1 | 1/2005 | Prober et al. |
| 2005/0020837 A1 | 1/2005 | Doherty et al. |
| 2005/0026092 A1 | 2/2005 | Nagase |
| 2005/0032357 A1 | 2/2005 | Rantala et al. |
| 2005/0042538 A1 | 2/2005 | Babich et al. |
| 2005/0058929 A1 | 3/2005 | Kennedy et al. |
| 2005/0064726 A1 | 3/2005 | Reid et al. |
| 2005/0074689 A1 | 4/2005 | Angelopoulos et al. |
| 2005/0074981 A1 | 4/2005 | Meagley et al. |
| 2005/0077639 A1 | 4/2005 | Foreman et al. |
| 2005/0080214 A1 | 4/2005 | Shin et al. |
| 2005/0090570 A1 | 4/2005 | Lyu et al. |
| 2005/0092206 A1 | 5/2005 | Sakamoto et al. |
| 2005/0096408 A1 | 5/2005 | Wakamura |
| 2005/0106376 A1 | 5/2005 | Leung et al. |
| 2005/0119394 A1 | 6/2005 | Sakurai et al. |
| 2005/0136268 A1 | 6/2005 | Shin et al. |
| 2005/0136687 A1 | 6/2005 | Lu et al. |
| 2005/0171277 A1 | 8/2005 | Li et al. |
| 2005/0221225 A1 | 10/2005 | Kawana et al. |
| 2005/0234167 A1 | 10/2005 | Bae et al. |
| 2005/0245717 A1 | 11/2005 | Kennedy et al. |
| 2005/0255326 A1 | 11/2005 | Sakurai et al. |
| 2006/0027803 A1 | 2/2006 | Lu et al. |
| 2006/0035419 A1 | 2/2006 | Lu et al. |
| 2006/0046079 A1 | 3/2006 | Lee et al. |
| 2006/0047034 A1 | 3/2006 | Sakurai et al. |
| 2006/0052566 A1 | 3/2006 | Sakurai et al. |
| 2006/0057491 A1 | 3/2006 | Wayton et al. |
| 2006/0057801 A1 | 3/2006 | Rantala et al. |
| 2006/0110682 A1 | 5/2006 | Thackeray et al. |
| 2006/0115658 A1 | 6/2006 | Mah et al. |
| 2006/0127587 A1 | 6/2006 | Kang et al. |
| 2006/0131753 A1 | 6/2006 | Rantala et al. |
| 2006/0132459 A1 | 6/2006 | Huddleston et al. |
| 2006/0133756 A1 | 6/2006 | Shelnut et al. |
| 2006/0134441 A1 | 6/2006 | Mah et al. |
| 2006/0135633 A1 | 6/2006 | Lee et al. |
| 2006/0141163 A1 | 6/2006 | Choi et al. |
| 2006/0141641 A1 | 6/2006 | Fan et al. |
| 2006/0145306 A1 | 7/2006 | Lee et al. |
| 2006/0155594 A1 | 7/2006 | Almeida et al. |
| 2006/0159938 A1 | 7/2006 | Lee et al. |
| 2006/0175685 A1 | 8/2006 | Shin et al. |
| 2006/0205236 A1 | 9/2006 | Li et al. |
| 2006/0255315 A1 | 11/2006 | Yellowaga et al. |
| 2006/0257575 A1 | 11/2006 | Macor et al. |
| 2006/0258146 A1 | 11/2006 | Rantala et al. |
| 2006/0264595 A1 | 11/2006 | Lyu et al. |
| 2006/0286813 A1 | 12/2006 | Meredith et al. |
| 2006/0289849 A1 | 12/2006 | Yagihashi et al. |
| 2007/0004587 A1 | 1/2007 | Chebiam et al. |
| 2007/0018926 A1 | 1/2007 | Shin et al. |
| 2007/0020899 A1 | 1/2007 | Hirai et al. |
| 2007/0021025 A1 | 1/2007 | Kim et al. |
| 2007/0022909 A1 | 2/2007 | Kennedy et al. |
| 2007/0023837 A1 | 2/2007 | Lee et al. |
| 2007/0023864 A1 | 2/2007 | Khater |
| 2007/0024181 A1 | 2/2007 | Oh |
| 2007/0024766 A1 | 2/2007 | Song et al. |
| 2007/0024770 A1 | 2/2007 | Jang et al. |
| 2007/0024775 A1 | 2/2007 | Lee et al. |
| 2007/0024783 A1 | 2/2007 | Joo |
| 2007/0024788 A1 | 2/2007 | Kamiya et al. |
| 2007/0024790 A1 | 2/2007 | Chang et al. |
| 2007/0026104 A1 | 2/2007 | Nakano |
| 2007/0027225 A1 | 2/2007 | Lyu et al. |
| 2007/0029547 A1 | 2/2007 | Parker |
| 2007/0030407 A1 | 2/2007 | Kwak et al. |

(56) References Cited

U.S. PATENT DOCUMENTS

| | | |
|---|---|---|
| 2007/0030428 A1 | 2/2007 | Lu et al. |
| 2007/0030431 A1 | 2/2007 | Lee et al. |
| 2007/0030434 A1 | 2/2007 | Hirabayashi et al. |
| 2007/0030437 A1 | 2/2007 | Kim et al. |
| 2007/0034879 A1 | 2/2007 | Park et al. |
| 2007/0035225 A1 | 2/2007 | Lee et al. |
| 2007/0035673 A1 | 2/2007 | Sakurai et al. |
| 2007/0035675 A1 | 2/2007 | Um et al. |
| 2007/0051274 A1 | 3/2007 | Saito et al. |
| 2007/0088144 A1 | 4/2007 | Kang et al. |
| 2007/0111014 A1 | 5/2007 | Katsoulis et al. |
| 2007/0134435 A1 | 6/2007 | Ahn et al. |
| 2007/0197727 A1 | 8/2007 | Lewin et al. |
| 2008/0032052 A1 | 2/2008 | Kourtakis et al. |
| 2008/0157065 A1 | 7/2008 | Krishnamoorthy et al. |
| 2008/0185041 A1 | 8/2008 | Sharma et al. |
| 2008/0196626 A1* | 8/2008 | Wu .................. C08G 77/06 106/287.34 |
| 2008/0206690 A1 | 8/2008 | Kennedy et al. |
| 2009/0004606 A1 | 1/2009 | Albaugh et al. |
| 2009/0029145 A1 | 1/2009 | Thies et al. |
| 2009/0068377 A1 | 3/2009 | Kuki |
| 2009/0087665 A1 | 4/2009 | Suzuki et al. |
| 2009/0101203 A1 | 4/2009 | Sharma |
| 2009/0146175 A1 | 6/2009 | Bahadur et al. |
| 2009/0264572 A1 | 10/2009 | Liao et al. |
| 2009/0275694 A1 | 11/2009 | Baldwin-Hendricks et al. |
| 2009/0298671 A1 | 12/2009 | Weigel et al. |
| 2010/0092763 A1 | 4/2010 | Kleiman-Shwarsctein et al. |
| 2010/0255412 A1 | 10/2010 | Sun |
| 2011/0117746 A1 | 5/2011 | Maruyama et al. |
| 2011/0135847 A1 | 6/2011 | Phillps et al. |
| 2011/0171447 A1 | 7/2011 | Krishnamoorthy et al. |
| 2011/0201827 A1 | 8/2011 | Lichtenhan et al. |
| 2011/0241175 A1 | 10/2011 | Koh et al. |
| 2012/0070689 A1 | 3/2012 | Kennedy et al. |
| 2012/0146088 A1 | 6/2012 | Tanikawa et al. |
| 2012/0196225 A1 | 8/2012 | Li |
| 2012/0237676 A1 | 9/2012 | Kalyankar et al. |
| 2013/0071560 A1* | 3/2013 | Rao .................. G03F 7/0752 427/162 |
| 2013/0131265 A1* | 5/2013 | Inoue .................. C08L 83/04 524/588 |
| 2013/0164545 A1* | 6/2013 | Evans .................. C09D 5/006 428/447 |
| 2013/0233826 A1 | 9/2013 | Seko et al. |
| 2013/0256264 A1 | 10/2013 | Tanaka et al. |
| 2014/0011932 A1 | 1/2014 | Ahn et al. |
| 2014/0335698 A1 | 11/2014 | Singh et al. |
| 2015/0041959 A1 | 2/2015 | Koh et al. |
| 2015/0050597 A1 | 2/2015 | Ahn et al. |
| 2015/0056457 A1 | 2/2015 | Kerstetter et al. |
| 2015/0073069 A1 | 3/2015 | De Gans et al. |
| 2015/0079792 A1 | 3/2015 | Shigaki et al. |
| 2015/0116827 A1 | 4/2015 | Wang et al. |
| 2015/0218410 A1 | 8/2015 | Matsubayashi et al. |
| 2015/0240126 A1 | 8/2015 | Wigglesworth et al. |
| 2015/0249167 A1 | 9/2015 | Zhang et al. |
| 2015/0294880 A1 | 10/2015 | Anderson et al. |
| 2016/0032147 A1 | 2/2016 | Maghsoodi et al. |
| 2016/0244581 A1 | 8/2016 | Brink et al. |
| 2017/0260419 A1 | 9/2017 | Iwamoto et al. |

FOREIGN PATENT DOCUMENTS

| | | |
|---|---|---|
| CN | 104262628 B | 8/2016 |
| CN | 106062042 A | 10/2016 |
| DE | 19852852 A1 | 5/2000 |
| EP | 0144880 A1 | 6/1985 |
| EP | 0152377 B1 | 12/1987 |
| EP | 0184248 B1 | 8/1989 |
| EP | 0229629 B1 | 3/1991 |
| EP | 0146411 B1 | 7/1991 |
| EP | 0217137 B1 | 4/1992 |
| EP | 0159428 B1 | 11/1992 |
| EP | 0204963 B1 | 1/1993 |
| EP | 0388503 B1 | 9/1993 |
| EP | 0323186 B1 | 3/1994 |
| EP | 0458651 B1 | 3/1994 |
| EP | 0225676 B1 | 7/1994 |
| EP | 0327311 B1 | 9/1994 |
| EP | 0401499 B1 | 12/1995 |
| EP | 0422570 B1 | 12/1995 |
| EP | 0427395 B1 | 4/1996 |
| EP | 0449263 B1 | 6/1996 |
| EP | 0725103 A2 | 8/1996 |
| EP | 0727711 A2 | 8/1996 |
| EP | 0494744 B1 | 9/1996 |
| EP | 0423446 B1 | 3/1998 |
| EP | 0659904 B1 | 7/1998 |
| EP | 0881678 A2 | 12/1998 |
| EP | 0911875 A2 | 4/1999 |
| EP | 0669010 B1 | 6/2000 |
| EP | 0902067 B1 | 7/2001 |
| EP | 0851300 B1 | 10/2001 |
| EP | 1149412 B9 | 10/2001 |
| EP | 0687004 B1 | 12/2002 |
| EP | 1046689 B1 | 6/2003 |
| EP | 1142832 B1 | 12/2004 |
| EP | 1376671 B1 | 6/2007 |
| EP | 1829945 A1 | 9/2007 |
| EP | 1674904 B1 | 12/2008 |
| EP | 1296365 B1 | 9/2010 |
| EP | 1659423 B1 | 1/2011 |
| GB | 1316144 A | 5/1973 |
| GB | 385241 A | 2/1975 |
| GB | 601288 A | 10/1981 |
| JP | S63191868 A | 8/1988 |
| JP | H03257027 A | 11/1991 |
| JP | 4021438 A2 | 1/1992 |
| JP | H0570738 A | 3/1993 |
| JP | H08208840 A | 8/1996 |
| JP | 2001092122 A | 4/2001 |
| JP | 2001152023 A | 6/2001 |
| JP | 4697363 B2 | 2/2002 |
| JP | 2002129103 A | 5/2002 |
| JP | 4862217 B2 | 8/2002 |
| JP | 2002235037 A | 8/2002 |
| JP | 2003050459 A | 2/2003 |
| JP | 2003064306 A | 3/2003 |
| JP | 2003064307 A | 3/2003 |
| JP | 2003183575 A | 7/2003 |
| JP | 2003253204 A | 9/2003 |
| JP | 2003257963 A | 9/2003 |
| JP | 2004277501 A | 10/2004 |
| JP | 2005042118 A | 2/2005 |
| JP | 2005048190 A | 2/2005 |
| JP | 2005072615 A | 3/2005 |
| JP | 2005099693 A | 4/2005 |
| JP | 2005105281 A | 4/2005 |
| JP | 2005105282 A | 4/2005 |
| JP | 2005105283 A | 4/2005 |
| JP | 2005105284 A | 4/2005 |
| JP | 2005136429 A | 5/2005 |
| JP | 2005139265 A | 6/2005 |
| JP | 2005146282 A | 6/2005 |
| JP | 2006045352 A | 2/2006 |
| JP | 2006182811 A | 7/2006 |
| JP | 2006183028 A | 7/2006 |
| JP | 2006183029 A | 7/2006 |
| JP | 2006213908 A | 8/2006 |
| JP | 2006241407 A | 9/2006 |
| JP | 2006249181 A | 9/2006 |
| JP | 2006276598 A | 10/2006 |
| JP | 4563894 B2 | 3/2007 |
| JP | 2007254677 A | 10/2007 |
| JP | 200833016 A | 2/2008 |
| JP | 4564735 B2 | 10/2010 |
| JP | 2010532792 A | 10/2010 |
| JP | 4922292B2 B2 | 4/2012 |
| JP | 2012222202 A | 11/2012 |
| JP | 2014208838 A | 11/2014 |
| JP | 2015146332 A | 8/2015 |

(56) References Cited

FOREIGN PATENT DOCUMENTS

| | | |
|---|---|---|
| JP | 2015155541 A | 8/2015 |
| KR | 100845403 B1 | 7/2008 |
| KR | 101113037 B1 | 1/2010 |
| KR | 20110074677 A | 7/2011 |
| KR | 1020110074677 A | 7/2011 |
| KR | 101390605 B1 | 4/2014 |
| KR | 101492251 B1 | 12/2014 |
| KR | 1026211 B1 | 7/2017 |
| WO | WO1990003598 A1 | 4/1990 |
| WO | WO2000031183 A1 | 6/2000 |
| WO | WO2000041231 A1 | 7/2000 |
| WO | WO2000077575 A1 | 12/2000 |
| WO | WO0124244 A1 | 4/2001 |
| WO | WO0129052 A1 | 4/2001 |
| WO | WO2001029052 A1 | 4/2001 |
| WO | WO2002006402 A1 | 1/2002 |
| WO | WO2002016477 A2 | 2/2002 |
| WO | WO2003044077 A1 | 5/2003 |
| WO | WO2003044078 A1 | 5/2003 |
| WO | WO2003044600 A1 | 5/2003 |
| WO | WO2003088343 A1 | 10/2003 |
| WO | WO2003088344 A1 | 10/2003 |
| WO | WO2003089992 A1 | 10/2003 |
| WO | WO2004044025 A2 | 5/2004 |
| WO | WO2003070809 B1 | 7/2004 |
| WO | 2004101651 A1 | 11/2004 |
| WO | WO2005036270 A1 | 4/2005 |
| WO | WO2005037907 A1 | 4/2005 |
| WO | WO2005049757 A1 | 6/2005 |
| WO | WO2005080629 A2 | 9/2005 |
| WO | WO2006128232 A1 | 12/2006 |
| WO | 2008124711 A1 | 10/2008 |
| WO | WO2009038250 A1 | 3/2009 |
| WO | WO2010079495 A1 | 7/2010 |
| WO | 2014152686 A2 | 9/2014 |
| WO | 2015026652 A1 | 2/2015 |

OTHER PUBLICATIONS

Katayama, M. "TFT-LCD Technology." Elsevier, Thin Solid Films, 341:140-147, 1999.

Matsumura, Hideki. "Silicon Nitride Produced by Catalytic Chemical Vapor Deposition Method." Journal of Applied Physics, 66:3612-3617, 1989.

Mok, T.S., et al. "Study of Process Dependent Reliability in SiOC Dielectric Interconnects and Film." IEEE, Proceedings of 11th IPFA 2004, Taiwan, pp. 181-184.

Ogawa, E. T., et al. "Stress-Induced Voiding Under Vias Connected to Wide Cu Metal Leads." IEEE, 40th Annual International Reliability Physics Symposium, Dallas, Texas, 2012, pp. 312-321.

Ruelke, Hartmut, et al. "Implementation of CVD low-k dielectrics for high-volume production." Solid State Technology, Copper/Low-K, Jan. 2004, pp. 60-63.

Hogan, Zach L., et al. "Patterned Nanoporous Poly(Methylsilsesquioxane) Thin Films: A Potential High Density Substrate." Materials Science and Engineering, C 24:487-490, 2004.

International Preliminary Report on Patentability issued in PCT/US2016/020373, dated Oct. 26, 2017, 8 pages.

International Search Report and Written Opinion issued in PCT/US20171020652, dated Jul. 17, 2017, 12 pages.

Kim, B.R., et al. "Adhesion Properties of Polymethylsilsesquioxane Based Low Dielectric Constant Materials by the Modified Edge Lift-Off Test." Microelectronic Engineering, 85:74-80, 2008.

Kim, Hie-Joon, et al. "Observation of Low Molecular Weight Poly(methylsilsesquioxane)s by Graphite Plate Laser Desorption/Ionization Time-of-Flight Mass Spectrometry." Anal. Chem., 72:5673-5678, 2000.

Lee, Jin-Kyu, et al. "Synthetic Control of Molecular Weight and Microstructure of Processible Poly(Methylsilsesquioxane)s for Low-Dielectric Thin Film Applications." Polymer, 42:9085-9089, 2001.

Saviour A. Umoren et al., "Polymer Characterization: Polymer Molecular Weight Determination", Polymer Science: research advances, practical applications and educational aspects, Formatex Research Center S.L.; 1 edition (Jun. 14, 2016), pp. 412-419.

Supplemental European Search Report issued in EP application 16780418.6, dated Apr. 17, 2018, 7 pages.

* cited by examiner

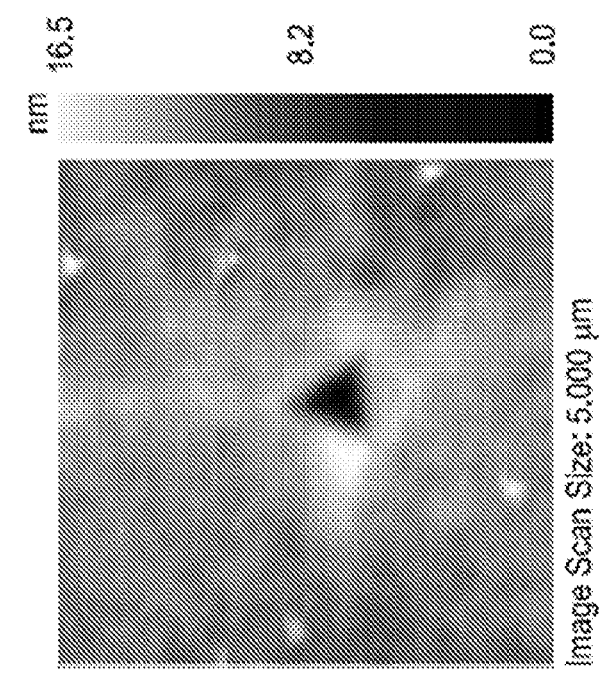
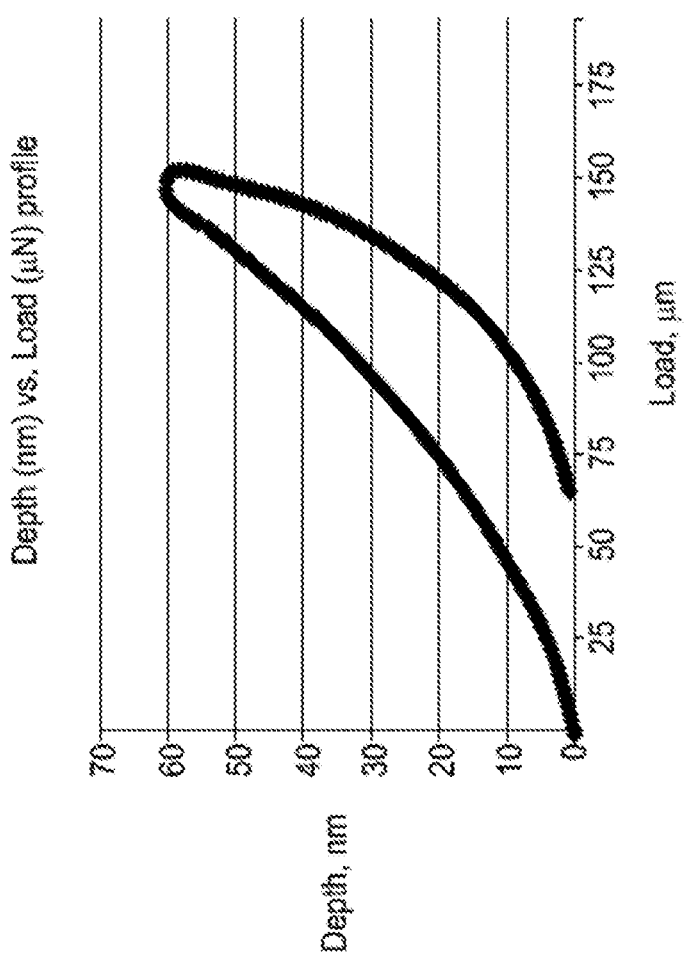
FIG. 8B
FIG. 8A

POLYSILOXANE FORMULATIONS AND COATINGS FOR OPTOELECTRONIC APPLICATIONS

CROSS-REFERENCE TO RELATED APPLICATION

This application is the U.S. national stage of PCT/US2016/020373, published as WO 2016/167892, filed Mar. 2, 2016, which claims the benefit under Title 35, U.S.C. § 119(e) of U.S. Provisional Patent Application Serial No. 62/146,593, filed Apr. 13, 2015, each of which is hereby incorporated by reference herein in its entirety.

TECHNICAL FIELD

The present disclosure relates generally to polysiloxane formulations and coatings made from those compositions, and more particularly to polysiloxane formulations and coatings for use in optoelectronic devices and applications.

BACKGROUND

Polysiloxane coatings for electronic, optoelectronic, and display devices are disclosed, for example, in U.S. Pat. No. 8,901,268, entitled, COMPOSITIONS, LAYERS AND FILMS FOR OPTOELECTRONIC DEVICES, METHODS OF PRODUCTION AND USES THEREOF, the disclosure of which are hereby incorporated by reference in their entirety.

In a typical polysiloxane coating, the coating is formed from a hydrolysis and condensation reaction of silicon-based compounds, such as siloxane monomers or oligomers, often with the use of a condensation catalyst. Such coating formulations may be associated with certain limitations, including one or more of limited shelf life, lower pH, the presence of water in the formulation, and limited film thickness.

In some typical coatings, film thickness is limited due to restrictions on the solid content of the formulation. At too high of a solid content, the polymerization reaction has a tendency to react until the formulation becomes gelled, rendering it unsuitable for forming an electronic or optoelectronic coating. In some typical devices, the polysiloxane coating is applied to a substrate or coating that is sensitive to moisture. Application of a formulation containing water to the substrate or coating may damage the moisture sensitive material, such as siloxane materials that contain Si—H entities, which are sensitive to moisture. In some typical devices, the polysiloxane coating is applied to a substrate or coating that is sensitive to pH. Application of a formulation to the substrate or coating may damage the pH sensitive material, such as metallic patterns of interconnects that may be sensitive to acidic or basic media.

In addition, touch-enabled high pixel density (pixel per inch or ppi) displays with increasing battery life and higher viewing pleasure require increasing individual pixel operation by minimizing power consumption at the thin film transistor (TFT) level. For touch-enabled advanced displays with higher resolution individual pixels are connected to multiple thin film transistors (TFTs) to achieve maximum resolution and maximum pleasure of viewing for consumers. Building thermally-stable oxide TFTs on a smooth substrate by applying a thermally stable planarization layer on the solid substrate, preferably glass, decreases leakage during TFT operation and lowers power consumption during switching on and off of the device. Oxide TFTs, such as indium gallium zinc oxide (IGZO) have low off current, providing long battery life for a display device compared to amorphous and low temperature polysilicon TFTs. Copper, aluminum, or molybdenum interconnects require a thermally stable (350° C.-400° C., preferably 380° C.) planarizing dielectric material for oxide TFT with low out gassing. Additionally, interconnects of copper, aluminum, or molybdenum require a relatively thicker barrier material, such as silicon nitride, to prevent diffusion, which generally adds to the fabrication costs. However, typical planarization materials do not meet the requirements to be an effective diffusion barrier or a supplementary diffusion barrier.

Improvements in the foregoing are desired.

SUMMARY

The present disclosure provides polysiloxane formulations including one or more solvents and one or more silicon-based compounds. The present disclosure further provides coatings formed from such formulations.

In one exemplary embodiment, a composition is provided. The composition includes at least one silicon-based material, wherein the at least one silicon-based material comprises a percentage of carbon atoms contained in alkyl groups from greater than 20% to 100% based on the total number of carbon atoms in the silicon-based material; and at least one solvent. In a more particular embodiment of any of the above embodiments, the at least one silicon-based material comprises a first silicon-containing resin comprising alkyl groups and aryl groups and a second silicon-containing resin comprising aryl groups. In a more particular embodiment of any of the above embodiments, the first silicon-containing resin comprises methylsiloxane and phenylsiloxane and the second silicon-containing resin comprises phenylsiloxane.

In one exemplary embodiment, a composition is provided. The composition includes at least one silicon-based material, wherein the at least one silicon-based material comprises a first siloxane resin comprising at least one of alkyl groups and aryl groups and a second siloxane resin comprising aryl groups; and at least one solvent. In one more particular embodiment, the first silicon-containing resin has a weight average molecular weight from 1000 AMU to 10,000 AMU and the second silicon-containing resin has a weight average molecular weight from 900 AMU to 5000 AMU. In a more particular embodiment of any of the above embodiments, the alkyl groups of the first siloxane resin comprise methyl groups. In a more particular embodiment of any of the above embodiments, the first siloxane resin comprises dimethyl siloxane. In a more particular embodiment of any of the above embodiments, the aryl groups of the first siloxane resin comprise phenyl groups. In a more particular embodiment of any of the above embodiments, the aryl groups of the second siloxane resin comprise phenyl groups. In a more particular embodiment of any of the above embodiments, the first silicon-containing resin comprises methylsiloxane and phenylsiloxane and the second silicon-containing resin comprises phenylsiloxane.

In one exemplary embodiment, a composition is provided. The composition includes at least one silicon-based material, wherein the at least one silicon-based material comprises a difunctional siloxane; and at least one solvent. In a more particular embodiment, the difunctional siloxane in dimethylsiloxane. In a more particular embodiment of any of the above embodiments, the silicon-based material comprises at least 0.1 mol. % difunctional siloxane, as a percent of the total moles of siloxane in the silicon-based material. In a more particular embodiment of any of the above embodiments, the at least one silicon-based material comprises a first silicon-containing resin comprising alkyl groups and aryl groups and a second silicon-containing resin comprising aryl groups, and wherein the first silicon-containing resin comprises the difunctional siloxane. In a more particular embodiment of any of the above embodiments, the first silicon-containing resin comprises methylsiloxane, dimethylsiloxane and phenylsiloxane and the second silicon-containing resin comprises phenylsiloxane.

In one exemplary embodiment, a composition is provided. The composition is a crosslinkable composition comprising a first silicon-containing resin comprising alkyl groups and aryl groups and a second silicon-containing resin comprising aryl groups; at least one solvent; and at least one heat-activated catalyst. In a more particular embodiment, the composition further includes at least one surfactant. In a more particular embodiment of either of the above embodiments, the composition further includes at least one adhesion promoter in a more particular embodiment of any of the above embodiments the first silicon-containing resin comprises methyl siloxane and phenyl siloxane and the second silicon-containing resin comprises phenylsiloxane. In a more particular embodiment of any of the above embodiments the first silicon-containing resin further comprises a difunctional siloxane, such as dimethyl siloxane. In an even more particular embodiment, the difunctional siloxane comprises at least 0.1 mol. % as a percent of the total moles of siloxane in the first silicon-containing resin. In a more particular embodiment of any of the above embodiments, a percentage of carbon atoms contained in alkyl groups from greater than 10% to 100% based on the total number of carbon atoms in the first and second silicon-containing resins, or even more particularly from greater than 20% to 100%.

In one exemplary embodiment, a composition is provided. The composition is a crosslinkable composition comprising at least one silicon-based material having a weight average molecular weight from 1000 AMU to 10,000 AMU, wherein the at least one silicon-based material comprises a percentage of carbon atoms contained in alkyl groups from greater than 20% to 100% based on the total number of carbon atoms in the silicon-based material; at least one solvent; and at least one heat-activated catalyst. In a more particular embodiment, the composition further includes one or more surfactants. In a more particular embodiment, the composition further includes one or more adhesion promoters.

In a more particular embodiment of any of the above embodiments, the composition further includes at least one heat-activated catalyst, such as a quaternary ammonium salts selected from tetramethylammonium acetate (TMAA), tetramethylammonium hydroxide (TMAH), tetrabutylammonium hydroxide (TBAH), tetrabutylammonium acetate (TBAA), cetyltrimethylammonium acetate (CTAA), tetramethylammonium nitrate (TMAN). In a more particular embodiment of any of the above embodiments, the composition further includes at least one surfactant. In a more particular embodiment of any of the above embodiments, the composition further includes at least one adhesion promoter. In a more particular embodiment of any of the above embodiments, the composition further includes at least one plasticizer. In a more particular embodiment of any of the above embodiments, the composition further includes at least one organic acid. In a more particular embodiment of any of the above embodiments, the composition further includes at least one monofunctional silane.

In a more particular embodiment of any of the above embodiments, the composition is water-free.

In one exemplary embodiment, a composition is provided. The composition includes at least one silicon-based material, wherein the at least one silicon-based material comprises at least one of alkyl groups and aryl groups; at least one solvent; at least one heat-activated catalyst; and at least one surfactant, wherein the composition is water free. In a more particular embodiment, the at least one solvent consists of water-free anhydrous solvents. In another more particular embodiment, the composition has less than 0.2 wt. % water. In another more particular embodiment, the composition has 0 wt. % water. In another more particular embodiment, the composition includes no external water. In a more particular embodiment of any of the above embodiments, the composition further includes one or more additives selected from the group consisting of: adhesion promoters, endcapping agents, and organic acids.

In a more particular embodiment of any of the above embodiments, the composition is a crosslinkable composition.

In one exemplary embodiment, a crosslinked film is provided. The crosslinked film is formed from a composition according to any of the above embodiments. In a more particular embodiment, the crosslinked film has a thickness of 1.5 µm or greater. In another more particular embodiment, the crosslinked film has a thickness of 3.0 µm or greater. In a more particular embodiment of any of the above embodiments, the crosslinked film is cured at a temperature of 350° C. or greater. In a more particular embodiment of any of the above embodiments, the crosslinked film is cured at a temperature of 390° C. or greater. In a more particular embodiment of any of the above embodiments, the crosslinked film has a transmittance to light in the visible optical wavelength range from 400 to 1000 nm of 95% or greater.

In one exemplary embodiment, a device having a surface is provided. The surface includes a crosslinked film according to any of the above embodiments, or includes a crosslinked film formed from any of the above embodiments. In a more particular embodiment of any of the above embodiments, the device is selected from the group consisting of a transistor, a light-emitting diode, a color filter, a photovoltaic cell, a flat-panel display, a curved display, a touch-screen display, an x-ray detector, an active or passive matrix OLED display, an active matrix think film liquid crystal display, an electrophoretic display, a CMOS image sensor, and combinations thereof. In a more particular embodiment of any of the above embodiments, the crosslinked film forms a passivation layer, a planarization layer, a barrier layer, or a combination thereof.

In one embodiment, a method of forming a composition is provided. The method includes combining a first siloxane resin, a second siloxane resin, and at least one solvent to form a crosslinkable composition, wherein the first siloxane resin comprises at least one of alkyl groups and aryl groups and the second siloxane resin comprises aryl groups. In a more particular embodiment, the alkyl groups of the first siloxane resin comprise methyl groups. In a more particular embodiment of any of the above embodiments. In a more particular embodiment of any of the above embodiments, the first siloxane resin comprise dimethyl siloxane. In a more particular embodiment of any of the above embodiments, the aryl groups of the first siloxane resin comprise phenyl groups. In a more particular embodiment of any of the above embodiments, the aryl groups of the second siloxane resin comprise phenyl groups in a more particular embodiment of any of the above embodiments, the composition further a total percentage of carbon atoms contained in alkyl groups from greater than 20% to 100% based on the total number of carbon atoms in alkyl and aryl groups.

In one exemplary embodiment, a method of forming a composition is provided. The method includes reacting a first organoalkoxysilane in a first solvent in the presence of a catalyst to produce a first silicon-based material, wherein the first silicon-based material includes at least one of alkyl groups and aryl groups; reacting a second organoalkoxysilane in a second solvent in the present of a catalyst to produce a second silicon-based material, wherein the second silicon-based material includes aryl groups; and combining the first and second silicon-based material to form a composition, wherein the composition comprises a percentage of carbon atoms contained in alkyl groups from greater than 20% to 100% based on the total number of carbon atoms in the first and second silicon-based materials. In a more particular embodiment, the first and second organoalkoxysilanes are independently selected from the group consisting of: methyltrimethoxysilane (MTMOS), methyltriethoxysilane (MTEOS), dimethyldiethoxysilane (DMDEOS), phenyl triethoxysilane (PTEOS), dimethyldimethoxysilane, phenyltrimethoxysilane, and combinations thereof.

In one exemplary embodiment, a method of forming a composition is provided. The method includes combining a first siloxane resin comprising alkyl groups and aryl groups, a second siloxane resin comprising aryl groups, a solvent, and a heat activated catalyst to form a crosslinkable composition; depositing the composition on a substrate; and curing the crosslinkable composition at a temperature of 350° C. or greater to form a crosslinked film, wherein the crosslinked film has a thickness of 1.5 μm or greater. In a more particular embodiment, the first siloxane resin comprises methylsiloxane and phenylsiloxane and the second silicon-containing resin comprises phenylsiloxane. In another more particular embodiment, the first siloxane resin further comprises dimethyl siloxane.

In a more particular embodiment, the method according to of any of the above embodiments, the composition further comprises at least one heat-activated catalyst and at least one surfactant. In a more particular embodiment of any of the above embodiments, the crosslinkable composition includes no water in a more particular embodiment of any of the above embodiments, the at least one solvent consists of PGMEA and PGPE. In a more particular embodiment of any of the above embodiments, the composition is a crosslinkable composition.

In a more particular embodiment, the method according any of the above embodiments further includes depositing the composition on a surface; and curing the composition to form a film. In a more particular embodiment, the film has a thickness of 1.5 μm or greater. In a more particular embodiment of any of the above embodiments, the crosslinked film has a thickness of 3.0 μm or greater. In a more particular embodiment of any of the above embodiments, curing the crosslinkable composition including curing at a temperature of 350° C. or greater. In a more particular embodiment of any of the above embodiments, curing the crosslinkable composition including curing at a temperature of 390° C. or greater.

In a more particular embodiment, according any of the above embodiments the first silicon-containing resin comprises methylsiloxane and phenylsiloxane and the second silicon-containing resin comprises phenylsiloxane, and the method further comprising reacting a phenyl TEOS-based polymer having a molecular weight of at least 1000 AMU in a solvent in the presence of a catalyst to form the second silicon-containing resin. In an even more particular embodiment, the catalyst is a basic catalyst, such as a tetraorganoammonium compound.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 8A is related to Example 9 and shows the depth vs. load profile for an exemplary coating.

FIG. 8B is related to Example 9 and shows a scanning probe microscope image of the indentation for an exemplary coating.

Corresponding reference characters indicate corresponding parts throughout the several views. The exemplifications set out herein are provided to illustrate certain exemplary embodiments and such exemplifications are not to be construed as limiting the scope in any manner.

DETAILED DESCRIPTION

I. Polysiloxane Formulation

Figure 1:
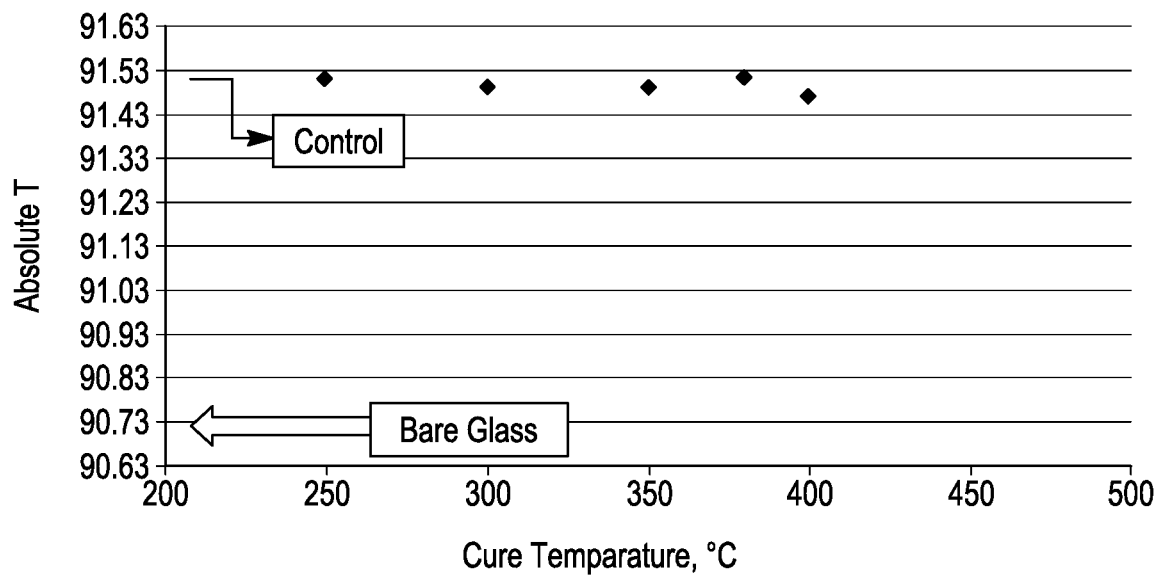
FIG. 1 is related to Example 4 and shows the absolute transmittance (350-800 nm) of the coatings.

In one exemplary embodiment, the polysiloxane formulation includes one or more solvents and one or more silicon-based compounds. In some exemplary embodiments, the formulation further includes one or more catalysts. In some exemplary embodiments, the formulation further includes one or more surfactants. In some exemplary embodiments, the formulation further includes one or more additional additives, such as adhesion promoters, plasticizers, organic acids, and monofunctional silanes.

a. Solvent

The formulation includes one or more solvents. Exemplary solvents include suitable pure organic molecules or mixtures thereof that are volatilized at a desired temperature and/or easily solvate the components discussed herein. The solvents may also comprise suitable pure polar and non-polar compounds or mixtures thereof. As used herein, the term "pure" means a component that has a constant composition. For example, pure water is composed solely of $H_2O$. As used herein, the term "mixture" means a component that is not pure, including salt water. As used herein, the term "polar" means that characteristic of a molecule or compound that creates an unequal charge, partial charge or spontaneous charge distribution at one point of or along the molecule or compound. As used herein, the term "non-polar" means that characteristic of a molecule or compound that creates an equal charge, partial charge or spontaneous charge distribution at one point of or along the molecule or compound.

Exemplary solvents include solvents that can, alone or in combination, modify the viscosity, intermolecular forces and surface energy of the solution in order to, in some cases, improve the gap-filling and planarization properties of the composition. It should be understood, however, that suitable solvents may also include solvents that influence the profile of the composition in other ways, such as by influencing the crosslinking efficiency, influencing the thermal stability, influencing the viscosity, and/or influencing the adhesion of the resulting layer or film to other layers, substrates or surfaces.

Exemplary solvents also include solvents that are not part of the hydrocarbon solvent family of compounds, such as ketones, including acetone, diethyl ketone, methyl ethyl ketone and the like, alcohols, esters, ethers and amines. Additional exemplary solvents include ethyl lactate, propylene glycol propylether (PGPE), propylene glycol monomethyl ether acetate (PGMEA) or a combination thereof. In one exemplary embodiment, the solvent comprises propylene glycol monomethyl ether acetate.

In one exemplary embodiment, formulation comprises as little as 50 wt. %, 55 wt. %, 60 wt. %, as great as 80 wt,%, 85 wt,%, 90 wt. % of the one or more solvents, or within any range defined between any two of the foregoing values, such as 50 wt. % to 90 wt. %, 55 wt. % to 85 wt. %, or 65 wt. % to 85 wt. %. The determination of the appropriate amount of solvent to add to composition depends on a number of factors, including: a) thicknesses of the desired layers or films, b) desired concentration and molecular weight of the solids in the composition, c) application technique of the composition and/or d) spin speeds, when spin-coating techniques are utilized. In addition, the higher the solid concentration (or the resin or polymer) is in the formulation, the higher the viscosity. Hence, the solid content may be increased (or the solvent amount reduced) to increase the viscosity as desired for a specific coating application technique. In addition, the viscous formulation or formulation with higher solid content will typically provide a thicker film thickness such as greater than 2 μm.

The solvents used herein may comprise any suitable impurity level. In some embodiments, the solvents utilized have a relatively low level of impurities, such as less than about 1 ppm, less than about 100 ppb, less than about 10 ppb, less than about 1 ppb, less than about 100 ppt, less than about 10 ppt and in some cases, less than about 1 ppt. These solvents may be purchased having impurity levels that are appropriate for use in these contemplated applications or may need to be further purified to remove additional impurities and to reach the less than about 10 ppb, less than about 1 ppb, less than about 100 ppt or lower levels that suitable and/or desired.

In one exemplary embodiment, the formulation includes no water. In a more particular embodiment, the solvent is an anhydrous solvent, and the silicon-based compounds, and any catalysts, surfactants, adhesion promoters, cross-linkers, initiators, or other additives are provided in a water-free anhydrous solvent. In some exemplary embodiment, "water-free" refers to a composition having less than 0.2 wt. %, 0.1 wt. %, 0.05 wt. %, 0.01 wt .% water, or 0 wt. % water. In some exemplary embodiments, "water-free" refers to a composition have no water. In some exemplary embodiments, "water-free" refers to a composition in which no external water is added, although some water may be formed from the hydrolysis-condensation reaction of the silicon-based compounds.

b. Silicon-based Compounds

The formulation includes one or more silicon-based compounds that can be crosslinked to form the polysiloxane. Exemplary silicon-based compounds comprise siloxane, silsesquioxane, polysiloxane, or polysilsesquioxane, such as methylsiloxane, methylsilsesquioxane, phenylsiloxane, phenylsilsesquioxane, methylphenylsiloxane, methylphenylsilsesquioxane, dimethylsiloxane, diphenylsiloxane, methylphenylsiloxane, polyphenylsilsesquioxane, polyphenylsiloxane, polymethylphenylsiloxane, polymethylphenylsilsesquioxane, polymethylsiloxane, polymethylsilsesquioxane, and combinations thereof. In some embodiments, the at least one silicon-based compound comprises polyphenylsilsesquioxane, polyphenylsiloxane, phenylsiloxane, phenylsilsesquioxane, methylphenylsiloxane, methylphenylsilsesquioxane, polymethylphenylsiloxane, polymethylphenylsilsesquioxane, polymethylsiloxane, polymethylsilsesquioxane or a combination thereof.

In some embodiments, the silicon-based compounds comprise a total amount of carbon atoms divided between carbon atoms in alkyl groups, such as methyl and ethyl groups, and carbon atoms in aryl groups, such as phenyl groups. In some embodiments, the number of carbon atoms contained in the alkyl groups is greater than 10%, 12%, 15% 20%, 21%, 25%, or greater than 30%, 31%, 40%, 50%, 60%, 70%, 75%, 80%, 85%, 90%, 95%, 99%, and less than 100%, or is 100%, based on the total number of carbon atoms contained in the alkyl and aryl groups, or may be between any range defined between any two of the foregoing values, such as from greater than 10% to less than 100%, from 12% to less than 100%, from greater than 20% to 100% or greater than 30% to less than 100%.

Without wishing to be held to any particular theory, it is believed that increasing the percentage of aryl carbon increases the stearic hindrance of the polysiloxane compounds resulting in a polysiloxane coating that has less crosslinking and is more flexible. In addition increasing the percentage of alkyl or aryl carbon by using difunctional silanes such as dialkyldialkoxy silane or diaryldialkoxy silane decreases number of reactive functional groups of the polysiloxane compounds resulting in a polysiloxane coating that has less crosslinking and is more flexible. However, increasing the flexibility of polysiloxane compounds also tends to produce films or coatings that are less resistant to chemicals. In some exemplary embodiments, the silicon-based compounds include a plasticizer or other suitable material to increase the flexibility of the formed polysiloxane.

Some contemplated silicon-based compounds include compositions formed from hydrolysis-condensation reactions of at least one reactant having the formula:

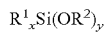

where $R^1$ is an alkyl, alkenyl, aryl, or aralkyl group, and x is an integer between 0 and 2, and where $R^2$ is a alkyl group or acyl group and y is an integer between 1 and 4. Materials also contemplated include silsesquioxane polymers of the general formula:

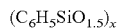

where x is an integer greater than about 4.

In some exemplary embodiments, the silicon-based material includes one or more polysiloxane resins, such as the Glass Resin polysiloxane resins available from Techneglas Technical Products, Perrysburg, Ohio. In one exemplary embodiment, polysiloxane resins are silicon-based oligomers formed from a limited hydrolysis and condensation reaction of one or more silicon-based monomers. Exemplary suitable silicon-based monomers include organoalkoxysilanes having a Si—C bond, such as methyltrimethoxysilane (MTMOS), methyltriethoxysilane (MTEOS), dimethyldiethoxysilane (DMDEOS), phenyl triethoxysilane (PTEOS), dimethyldimethoxysilane and phenyltrimethoxysilane. Other suitable silicon-based monomers lack an Si—C bond, such as tetraethylorthosilicate (TEOS). Exemplary resin materials include glass resins derived from organoalkoxysilanes such as methylsiloxane, dimethylsiloxane, phenylsiloxane, methylphenylsiloxane, tetraethoxysilane, and mixtures thereof.

In one exemplary embodiment, the polysiloxane resins have a structure selected from the group consisting of a linear structure, a cyclic structure, a cage-type structure, a ladder-type structure, and a partial-ladder/partial-cage type structure. In a more particular embodiment, the polysiloxane resins have a partial-ladder/partial-cage type structure.

In some exemplary embodiments, the polysiloxane resins include one or more alkyl groups and/or one or more aryl groups. Exemplary polysiloxane resins containing alkyl groups include methylsiloxane and dimethylsiloxane. Exemplary polysiloxane resins containing aryl groups include phenylsiloxane. Exemplary polysiloxane resins containing both alkyl and aryl groups include methylphenylsiloxane.

In one exemplary embodiment, each polysiloxane resin has a weight average molecular weight as little as 900 atomic mass unit (AMU), 950 AMU, 1000 AMU, 1100 AMU, 1150 AMU, as great as 2000 AMU, 3000 AMU, 4000 AMU, 5000 AMU, 10,000 AMU, or within any range defined between any two of the foregoing values, such as 900 AMU to 10,000 AMU, 1000 AMU to 10,000 AMU, or 900 AMU to 5000 AMU. In a more particular embodiment, the polysiloxane resin include a first polysiloxane resin containing alkyl groups such as methylsiloxane and/or dimethylsiloxane and a second polysiloxane resin containing aryl groups such as phenylsiloxane. In one embodiment, the first polysiloxane resin further contains aryl groups such as phenylsiloxane. In an even more particular embodiment, the first polysiloxane resin has a weight average molecular weight as little as 1000 atomic mass unit (AMU), 2000 AMU, 2200 AMU, 3000 AMU, 3800 AMU, 4000 AMU, as great as 4500 AMU, 4800 AMU, 5000 AMU, 7500 AMU, 10,000 AMU or within any range defined between any two of the foregoing values, such as 1000 AMU to 10,000 AMU, 2000 AMU to 5000 AMU, or 3800 AMU to 4800 AMU and the second polysiloxane resin has a weight average molecular weight as little as 900 atomic mass unit (AMU), 950 AMU, 1000 AMU, as great as 1150 AMU, 2000 AMU, 2500 AMU, 5000 AMU or within any range defined between any two of the foregoing values, such as 900 AMU to 5000 AMU, 900 AMU to 2000 AMU, or 950 AMU to 1150 AMU.

In some exemplary embodiments, the silicon-based material includes or is formed from one or more organoalkoxysilanes. Exemplary organoalkoxysilanes include methyltrimethoxysilane (MTMOS), methyltriethoxysilane (MTEOS), dimethyldiethoxysilane (DMDEOS), phenyl triethoxysilane (PTEOS), dimethyldimethoxysilane, phenyltrimethoxysilane, and combinations of the foregoing.

In some exemplary embodiments, the silicon-based material includes a blend of two or more pre-formed polysiloxane resins. In a more particular embodiment, two or more polysiloxane resins may be combined to provide a total number of carbon atoms contained in the alkyl groups from greater than 10%, 12%, greater than 20%, 21%, 25%, greater than 30%, 31%, 40%, 50%, 60%, 70%, 75%, 80%, 85%, 90%, 95%, 99%, less than 100%, 100%, based on the total number of carbon atoms contained in the alkyl and aryl groups, or between any range defined between any two of the foregoing values, such as from greater than 10% to 100%, from 12% to 100% from greater than 20% to 100%, or greater than 30% to less than 100%.

In another more particular embodiment, the silicon-based material may include one or more polysiloxane resins each including a difunctional silane. An exemplary difunctional slime is dimethylsiloxane. In a more particular embodiment, the silicon-based material may include as little as 0%, 0.1%, 0.5%, 1%, 2%, as high as 5%, 10%, 15%, 20% difunctional siloxane, as a molar percentage of the total moles of siloxane, or between any range defined between any two of the foregoing values, such as from 0% to 20% or from 0.1% to 2%.

c. Catalysts

In some exemplary embodiments, the formulation includes one or more catalysts. In some embodiments, the catalyst is a heat-activated catalyst. A heat-activated catalyst, as used herein, refers to a catalyst that is activated at or above a particular temperature, such as an elevated temperature. For example, at one temperature (such as room temperature) the composition maintains a low molecular weight, thus enabling good planarization ability over a surface. When the temperature is elevated (such as to greater than 50° C.), the heat-activated catalyst catalyzes a condensation reaction between two Si—OH functional groups, which results in a more dense structure and, in some cases, improved performance overall. Suitable condensation catalysts comprise those catalysts that can aid in maintaining a stable silicate solution. Exemplary metal-ion-free catalysts may comprise onium compounds and nucleophiles, such as an ammonium compound (such as quaternary ammonium salts), an amine, a phosphonium compound or a phosphine compound.

In one exemplary embodiment, the catalyst is not a photoacid, a photoacid generator, or a metal-based catalyst.

In some embodiments, the catalyst is relatively molecularly "small" or is a catalyst that produces relatively small cations, such as quaternary ammonium salts. In some embodiments, the one or more catalysts is selected from tetramethylammonium acetate (TMAA), tetramethylammonium hydroxide (TMAH), tetrabutylammonium hydroxide (TBAH), tetrabutylammonium acetate (TBAA), cetyltrimethylammonium acetate (CTAA), tetramethylammonium nitrate (TMAN), other ammonium-based catalysts, amine-based and/or amine-generating catalysts, and combinations thereof. Other exemplary catalysts include (2-hydroxyethyl)trimethylammonium chloride, (2-hydroxyethyl)trimethylammonium hydroxide, (2-hydroxyethyl)trimethylammonium acetate, (2-hydroxyethyl)trimethylammonium formate, (2-hydroxyethyl)trimethylammonium nitrate, (2-hydroxyethyl)trimethylammonium benzoate, tetramethylammonium formate and combinations thereof. Other exemplary catalysts include (carboxymethyl)trimethylammonium chloride, (carboxymethyl)trimethylammonium hydroxide, (carboxymethyl)trimethyl-ammonium formate and (carboxymethyl)trimethylammonium acetate.

In one exemplary embodiment, the formulation comprises as little as 0.001 wt. %, 0.004 wt. %, 0.01 wt. %, 0.1 wt. %, 0.3 wt. %, as great as 0.5 wt. %, 1 wt. %, 2 wt. %, 5 wt. %, or 10 wt. % of the one or more catalysts, or within any range defined between any two of the foregoing values, such as 0.1 wt. % to 10 wt. % or 1 wt. % to 2 wt. %.

In some exemplary embodiments, the one or more catalysts comprise TMAN. TMAN may be provided by either dissolving TMAN in water or in an organic solvent such as ethanol, propylene glycol propyl ether (PGPE), or by converting TMAA or TMAH to TMAN by using nitric acid.

d. Surfactant

In some exemplary embodiments, the formulation includes one or more surfactants. Surfactants may be added to lower surface tension. As used herein, the term "surfactant" means any compound that reduces the surface tension when dissolved in $H_2O$ or other liquids, or which reduces interfacial tension between two liquids, or between a liquid and a solid. Contemplated surfactants may include at least one anionic surfactant, cationic surfactant, non-ionic surfactant, Zwitterionic surfactant or a combination thereof. The surfactant may be dissolved directly into the composition or may be added with one of the compositions components (the at least one silicon-based compound, the at least one catalyst, the at least one solvent) before forming the final composition. Contemplated surfactants may include: polyether modified polydimethylsiloxanes such as BYK 307 (polyether modified poly-dimethyl-siloxane, BYK-Chemie), sulfonates such as dodecylbenzene sulfonate, tetrapropylenebenzene sulfonate, dodecylbenzene sulfonate, a fluorinated anionic surfactant such as Fluorad FC-93, and L-18691 (3M), fluorinated nonionic surfactants such as FC-4430 (3M), FC-4432 (3M), and L-18242 (3M), quaternary amines, such as dodecyltrimethyl-ammonium bromide or cetyltrimethylammonium bromide, alkyl phenoxy polyethylene oxide alcohols, alkyl phenoxy polyglycidols, acetylinic alcohols, polyglycol ethers such as Tergitol TMN-6 (Dow) and Tergitol minifoam 2× (Dow), polyoxyethylene fatty ethers such as Brij-30 (Aldrich), Brij-35 (Aldrich), Brij-58 (Aldrich), Brij-72 (Aldrich), Brij-76 (Aldrich), Brij-78 (Aldrich), Brij-98 (Aldrich), and Brij-700 (Aldrich), betaines, sulfobetaines, such as cocoamidopropyl betaine, and synthetic phospholipids, such as dioctanoylphosphatidylcholine and lecithin and combinations thereof.

In one exemplary embodiment, the formulation comprises as little as 0.001 wt. %, 0.005 wt. %, 0.01 wt. %, 0.05 wt. %, as great as 0.1 wt. %, 0.25 wt. %, 0.5 wt. %, 1 wt. % of the one or more surfactants, or within any range defined between any two of the foregoing values, such as 0.001 wt. % to 1 wt. % or 0.001 wt. % to 0.25 wt. %. The determination of the appropriate amount of a composition-modifying constituent to add to the composition depends on a number of factors, including: a) minimizing defects in the film, and/or b) balancing the film between good adhesion and desirable film properties.

e. Other Additives

In some exemplary embodiments, the formulation may include one or more additional additives, such as adhesion promoters, endcapping agents, and organic acids.

In one exemplary embodiment, the formulation includes one or more adhesion promoters in order to influence the ability of the layer, coating or film to adhere to surrounding substrates, layers, coatings, films and/or surfaces. The adhesion promoter may be at least one of: a) thermally stable after heat treatment, such as baking, at temperatures generally used for optoelectronic component manufacture, and/or b) promotes electrostatic and coulombic interactions between layers of materials, as well as promoting understood Van derWaals interactions in some embodiments. Exemplary adhesion promoters include aminopropyl triethoxysilane (APTEOS) and salts of APTEOS, vinyltriethoxy silane (VTEOS), glycidoxypropyltrimethoxy silane (GLYMO), and methacryloxypropyltriethoxy silane (MPTEOS). Other exemplary adhesion promoters include 3-(triethoxysilyl)propylsuccininc anhydride, dimethyldihydroxy silane, methylphenyl dihydroxysilane or combinations thereof. In one exemplary embodiment, the formulation comprises as little as 0.001 wt. %, 0.01 wt. %, 0.1 wt. %, 0.26 wt. % as great as 1 wt. %, 2.6 wt. %, 5 wt. %, 10 wt. %, 20 wt. % of the one or more adhesion promoters, or within any range defined between any two of the foregoing values, such as 0.001 wt. % to 20 wt. % or 0.26 wt % to 2.6 wt. %.

In one exemplary embodiment, the formulation includes one or more endcapping agents such as monofunctional silanes that include a single reactive functionality that is capable of reacting with silanol groups on polysiloxane molecules. Exemplary endcapping agents include trialkylsilanes such as trimethylethoxy silane, triethylmethoxy silane, trimethylacetoxy silane, trimethylsilane. In one exemplary embodiment, the formulation comprises as little as 0.1%, 0.5%, 1%, 2%, as great as 5%, 10%, 15%, 20%, or 25% of the one or more endcapping agents as a percentage of total moles of polysiloxane, or within any range defined between any two of the foregoing values, such as 2% to 20% or 5% to 10%.

In one exemplary embodiment, the formulation includes one or more organic acids. In some embodiments, the organic acid additives are volatile or decompose at high temperatures and help stabilize the formulation. Exemplary organic acids include p-toluenesulfonic acid, citric acid, formic acid, acetic acid, and trifluoroacetic acid. In one exemplary embodiment, the formulation comprises as little as 0. 1 wt. %, 0.5 wt. %, 1 wt. %, 2 wt. %, as great as 5 wt. %, 10 wt. %, 15 wt. %, 20 wt. %, or 25 wt. % of the one or more organic acids, or within any range defined between any two of the foregoing values, such as 2 wt. % to 20 wt. % or 5 wt. % to 10 wt. %.

II. Polysiloxane Coating

In some exemplary embodiments, the polysiloxane formulation forms a polysiloxane coating on a surface located in or on an electronic, optoelectronic, or display device.

In some exemplary embodiments, the polysiloxane formulation forms a light-transmissive coating. In a more particular embodiment, the light-transmissive coating has a transmittance to light in the visible optical wavelength range from 400 to 1000 nm. In some embodiments, the optical transmittance is as high as 80%, 85%, 90%, 95%, 97%, 98%, 99%, or higher, or within any range defined between any two of the foregoing values.

In some exemplary embodiments, one or polymer resins are selected to provide a desired refractive index. In one exemplary embodiment, the relative molar percentage of a resin having a relatively low refractive index, such as 100% methyltriethoxysilane resin, is relatively high to produce a polysiloxane coating having a relatively low refractive index. In another exemplary embodiment, the relative molar percentage of a resin having a relatively high refractive index, such as 100% phenyl triethoxysilane, is relatively high to produce a polysiloxane coating having a relatively high refractive index. In another exemplary embodiment, the relative molar proportions of a first resin having a relatively high refractive index and a second resin having a relatively low refractive index are selected to produce a polysiloxane coating having a desired refractive index between the refractive index of the first and second resins.

In some exemplary embodiments, the polysiloxane formulation forms a coating having a refractive index that is as little as less than 1.4, 1.4, 1.45, as great as 1.5, 1.55, 1.56, 1.6, or within any range defined between any two of the foregoing values, such as from less than 1.4 to 1.6 or from 1.4 to 1.56.

Exemplary devicesto which coatings of the present disclosure may be provided include CMOS Image Sensors, transistors, light-emitting diodes, color filters, photovoltaic cells, flat-panel displays, curved displays, touch-screen displays, x-ray detectors, active or passive matrix OLED displays, active matrix thin film liquid crystal displays, electrophoretic displays, and combinations thereof.

In some exemplary embodiments, the polysiloxane coating forms a passivation layer, a barrier layer, a planarization layer, or a combination thereof.

In some exemplary embodiments, the polysiloxane coating has a thickness as little as 0.1 µm, 0.3 µm, 0.5 µm, 1 µm, 1.5 µm, as great as 2 µm, 2.5 µm, 3 µm, 3.5 µm, 4 µm, or greater, or within any range defined between any two of the foregoing values.

In some exemplary embodiments, the polysiloxane coating is formed by applying the formulation to a substrate, followed by curing the formulation. Exemplary methods of applying the formulation include spin coating, spray coating, slot-die coating techniques. Curing refers to a polymerization process in which the silicon-based materials, such as silicon-based oligomers, react in the presence of a catalyst to hydrolyze and condense with other oligomers to form a higher molecular weight polymer or matrix. In one exemplary embodiments, a baking step is provided to remove at least part or all of the solvent. In some embodiments, the baking step is as short as 1 minute, 5 minutes, 10 minutes, 15 minutes, as long as 20 minutes, 30 minutes, 45 minutes, 60 minutes, or longer, at a temperature as low as 100° C., 200° C. 220° C., as high as 250° C., 275° C., 300° C., 320° C., 350° C., or higher. In one exemplary embodiment, a curing step is provided to polymerize the at least one silicon-based material such as by activating a heat-activated catalyst. In some embodiments, the curing step is as short as 10 minutes, 15 minutes, 20 minutes, as long as 30 minutes, 45 minutes, 60 minutes, or longer, at a temperature as low as 250° C., 275° C., 300° C., as high as 320° C., 350° C., 375° C., 380° C., 400° C. or higher.

In some exemplary embodiments, multiple layers of the formulation are subsequently applied and cured to form a multilayer coating. In some exemplary embodiments, the multilayer coating includes two, three, or more polysiloxane coating layers.

In some exemplary embodiments, the polysiloxane coating is resistant to multiple heating steps, such as curing or deposition of additional coatings or layers on the formed polysiloxane coating.

III. Pretreatment of Silicon-based Compound

In some exemplary embodiments, the silicon-based compound may be formed from two or more polymerization steps.

In one exemplary embodiment, a first silicon-based resin, such as an oligomeric resin, is formed from a first polymerization step of one or more organoalkoxysilanes. Exemplary organoalkoxysilanes include methyltrimethoxysilane (MTMOS), methyltriethoxysilane (MTEOS), dimethyldiethoxysilane (DMDEOS), phenyl triethoxysilane (PTEOS), dimethyldimethoxysilane, phenyltrimethoxysilane, and combinations of the foregoing. Exemplary first polymerization steps include acidic catalyzed polymerization, such as polymerization catalyzed with a mineral or organic acid, or a base catalyzed polymerization, such as polymerization catalyzed with an ammonium compound, an amine, a phosphonium compound or a phosphine compound. Exemplary mineral acids include nitric acid, hydrochloric acid, sulfuric acid, and hydrofluoric acid. Exemplary organic acids include sulfonic acid, trifluorosulfonic acids, and carboxylic acids, as well as thermal acid generators (TAG) capable of generating a sulfonic acid upon exposure to an elevated temperature. Exemplary basic catalysts include tetraorganoammonium compounds and tetraorganophosphonium compounds, such as tetramethylammonium acetate (TMAA), tetramethylammonium hydroxide (TMAH), tetrabutylammonium hydroxide (TBAH), tetrabutylammonium acetate (TBAA), cetyltrimethylammonium acetate (CTAA), tetramethylammonium nitrate (TMAN), triphenylamine, trioctylamine, tridodecylamine, triethanolamine, tetramethylphosphonium acetate, tetramethylphosphonium hydroxide, triphenylphosphine, trimethylphosphine, trioctylphosphine, and combinations thereof. In one exemplary embodiment, the catalyst is a mineral acid, such as nitric acid.

In one exemplary embodiment, the first silicon-based resin has a weight average molecular weight as little as 900 atomic mass unit (AMU), 950 AMU, 1000 AMU, 1100 AMU, 1150 AMU, as great as 2000 AMU, 3000 AMU, 4000 AMU, 5000 AMU, 10,000 AMU, or within any range defined between any two of the foregoing values, such as 900 AMU to 10,000 AMU, 1000 AMU to 10,000 AMU, or 900 AMU to 5000 AMU.

In one exemplary embodiment, a second silicon-based resin is formed from a second polymerization of the first polymer resin. Exemplary second polymerization steps include acidic catalyzed polymerization and base catalyzed polymerization, as described with respect to the first polymerization step, such as polymerization catalyzed with an ammonium compound, an amine, a phosphonium compound or a phosphine compound. Exemplary mineral acids include nitric acid, hydrochloric acid, sulfuric acid, and hydrofluoric acid. Exemplary organic acids include sulfonic acid, trifluorosulfonic acids, and carboxylic acids, as well as thermal acid generators (TAG) capable of generating a sulfonic acid upon exposure to an elevated temperature. Exemplary basic catalysts include tetraorganoammonium compounds and tetraorganophosphonium compounds, such as tetramethylammonium acetate (TMAA), tetramethylammonium hydroxide (TMAH), tetrabutylammonium hydroxide (TBAH), tetrabutylammonium acetate (TBAA), cetyltrimethylammonium acetate (CTAA), tetramethylammonium nitrate (TMAN), triphenylamine, trioctylamine, tridodecylamine, triethanolamine, tetramethylphosphonium acetate, tetramethylphosphonium hydroxide, triphenylphosphine, trimethylphosphine, trioctylphosphine, and combinations thereof. In one exemplary embodiment, the catalyst is a tetraorganoammonium compounds, such as TMAH or TMAN.

The second silicon-based resin has a weight average molecular weight greater than the first silicon-based resin. In one exemplary embodiment, the second silicon-based resin has a weight average molecular weight as little as 1000 AMU, 1100 AMU, 1150 AMU, as great as 2000 AMU, 3000 AMU, 4000 AMU, 5000 AMU, 10,000 AMU, or within any range defined between any two of the foregoing values, such as 1000 AMU to 5000 AMU, 2000 AMU to 5000 AMU, or 2000 AMU to 4000 AMU.

In one exemplary embodiment, the second polymerization is performed in a solvent, such ethyl lactate, propylene glycol propylether (PGPE), propylene glycol monomethyl ether acetate (PGMEA) or a combination thereof. The first silicon-based resin is added at a concentration as little as 10 wt. %, 20 wt. %, 30 wt. % 40 wt. %, as great as 45 wt. %, 50 wt. %, 60 wt. % or within any range defined between any two of the foregoing values, such as 10 wt. % to 60 wt. % or 30 wt. % to 45 wt. %. The basic catalyst is added at a concentration as little as 100 ppm, 200 ppm, 250 ppm, as great as 300 ppm, 400 ppm, 500 ppm, or greater, or within any range defined between any two of the foregoing values, such as 100 ppm to 500 ppm or 200 ppm to 300 ppm.

In one exemplary embodiment, the second polymerization is performed at a temperature as little as 60° C., 65° C., 70° C., 75° C., as high as 80° C., 90° C., 100° C., or within any range defined between any two of the forgoing values, such as 60° C. to 100° C. or 70° C. to 100° C. In a more particular embodiment, the second polymerization mixture is held at the temperature for as little as 1 hour, 2 hours, 3 hours, as great as 5 hours, 8 hours, 10 hours, or within any range defined between any two of the foregoing values, such as 1 hour to 10 hours, 2 hours to 10 hours, 2 hours to 8 hours, or 2 to 3 hours.

In one exemplary embodiment, a polysiloxane formulation as described above includes the second silicon-based resin, and one or more solvents. In some exemplary embodiments, the formulation further includes one or more additional silicon-based material as described above. In some exemplary embodiments, the formulation further includes one or more catalysts. In some exemplary embodiments, the formulation further includes one or more surfactants. In some exemplary embodiments, the formulation further includes one or more additional additives, such as adhesion promoters, plasticizers, organic acids, and monofunctional silanes.

In one exemplary embodiment, a coating formed from the polysiloxane formulation including the second silicon-based resin is formed by applying the polysiloxane formulation In one exemplary embodiment, the coating is formed by curing the polysiloxane formulation at a temperature of as little as 350° C., 360° C., 370°, as high as 375° C., 380° C., 385° C., 390° C. or higher.

In some exemplary embodiments, the polysiloxane coating is formed by applying the formulation to a substrate, such as a glass or $Si_3N_4$ coated or capped substrate and curing the formulation. In one exemplary embodiment, the coating is formed by curing the polysiloxane formulation at a temperature of as little as 350° C., 360° C., 370°, as high as 375° C., 380° C., 385° C., 390° C. or higher.

In some exemplary embodiments, the polysiloxane coating has a thickness as little as 0.1 µm, 0.2 µm, 0.5 µm, 0.8 µm, 1 µm, 1.2 µm 1.5 µm, 2 µm, as great as, 3 µm, 4 µm, 5 µm, 10 µm or greater, or within any range defined between any two of the foregoing values, such as0.1 µm to 10 µm, 1 µm to 5 µm, 1.2 µm to 5 µm, or 4 µm or greater.

In some exemplary embodiment, the as little as 0.5 wt. %, as little as 0.2 wt. %, as little as 0.1 wt. %, as little as 0.09 wt. %, as little as 0.05 wt. %, or as little as 0.02 wt. % outgassing at 350° C. for 1 hour in air, or within any range defined between any two of the foregoing values, such as 0.5 wt. % to 0.02 wt. %, or 0.1 wt. % to 0.05 wt. %. In some exemplary embodiment, the as little as 0.5 wt. %, as little as 0.2 wt. %, as little as 0.1 wt. %, as little as 0.09 wt. %, as little as 0.05 wt. %, or as little as 0.02 wt. % outgassing at 390° C. for 1 hour in air, or within any range defined between any two of the foregoing values, such as 0.5 wt. % to 0.02 wt. %, or 0.1 wt. % to 0.05 wt. %.

In some exemplary embodiments, the polysiloxane coating has a dielectric constant as little as about 2.8, 2.9, 3.0, as great as about 3.1, 3.2, or within any range defined between any two of the foregoing values, such as 2.8 to 3.2 or 3.0 to 3.2.

EXAMPLES

Example 1

Formulations Having Differing Contents of Alkyl Carbon

Polymer A: phenyl TEOS was reacted in an isopropyl alcohol solvent in the presence of an acid catalyst and water for 24 h at 100° C. After the reaction, the solvent was distilled out to obtain solid polymer. The polymer then dissolved and reprecipitated from an appropriate solvent system and vacuum dried at 50° C. overnight and ground to powder.

Polymer B: predetermined amounts of phenyl TEOS and methyl TEOS were reacted in an isopropyl alcohol solvent in the presence of an acid catalyst and water and 0.5% DMDEOS for 24 hours at 100° C. After the reaction the solvent was distilled out to obtain solid polymer. The polymer was then dissolved and reprecipitated from an appropriate solvent system and vacuum dried at 50° C. overnight and ground to powder.

Formulation 1: 90% of polymer B and 10% of polymer A by weight in PGMEA in the presence of 1-5% by weight surfactant and catalysts 1-5% by weight of final solution weight. The formulation obtained is diluted with PGMEA to obtain a desired thickness to be deposited by slit, roller, spray or spin coating process.

Formulation 2: The formulation was prepared as in Formulation 1, except that 95% polymer B and 5% polymer A were used.

Formulation 3: The formulation was prepared as in Formulation 1, except that 85% polymer B and 15% polymer A were used.

Formulation 4: The formulation was prepared as in Formulation 1, except that 50% polymer B and 50% polymer A were used. This formulation was found to have adhesion problems and was not resistant to chemicals.

Comparative Formulation C: A polysiloxane resin comprising equimolar proportions of MTEOS and PTEOS and about 0.3 mole % of DMDEOS, GR-150F available from Techneglas Technical Products, Perrysburg, Ohio, was dissolved in PGMEA solvent at desired % resin solids loading. Coating formulations were formed by adding PGMEA solvent, a small amount of dilute aqueous TMAN solution and BYK surfactant. Each coating was spun on a substrate at 1000-2500 rpm to deposit films of desired thicknesses and cured under similar conditions. Coatings were inspected for any micro cracks under optical microscope immediately after completely curing and after several days for any latent cracking.

Exemplary Formulations 5-7: A polysiloxane resin GR-950F, derived from PTEOS, was combined with a polysiloxane resin GR-150F, comprising equimolar proportions of MTEOS and PTEOS and about 0.3 mole % of DMDEOS. Both resins, available from Techneglas Technical Products, Perrysburg, Ohio, were dissolved in PGMEA solvent at desired weight ratios and desired % solids loading. For formulation 5, the ratio of GR-950:GR-150F was 1:9, for formulation 6, the ratio was 1:4, and for formulation 7, the ratio was 1:1. Coating formulations were formed by adding PGMEA solvent, a small amount of dilute aqueous TMAN solution and BYK surfactant. Each coating was spun on a substrate at 1000-2500 rpm to deposit films of desired thicknesses and cured under similar conditions. Coatings were inspected for any micro cracks under optical microscope immediately after completely curing and after several days for any latent cracking.

Exemplary Formulations 8-10: Polysiloxane resins comprising equimolar proportions of MTEOS and PTEOS and about 5 mol. % (Formulation 8), 10 mol. % (Formulation 9), or 15 mol. % (Formulation 10) of DMDEOS, obtained from Techneglas Technical Products, Perrysburg, Ohio, were dissolved in PGMEA solvent at desired % resin solids loading. Coating formulations of each resin were formed by adding PGMEA solvent, a small amount of dilute aqueous TMAN solution and BYK surfactant. Each coating was spun on a substrate at 1000-2500 rpm to deposit films of desired thicknesses and cured under similar conditions. Coatings were inspected for any micro cracks under optical microscope immediately after completely curing and after several days for any latent cracking.

Exemplary Formulations 11 and 12: Polysiloxane resins GR-150F was combined with the second polysiloxane resin GR-950F and a third polysiloxane resin comprising equimolar proportions of MTEOS and PTEOS and about 10 mol. % of DMDEOS, in 95/2.5/2.5 (Form. 11) and 90/5/5 (Form. 12) ratios and dissolved in PGMEA solvent at desired % resin solids loading. Coating formulations of each resin combination were formed by adding PGMEA solvent, a small amount of dilute aqueous TMAN solution and BYK surfactant. Each coating was spun on a substrate at 1000-2500 rpm to deposit films of desired thicknesses and cured under similar conditions. Coatings were inspected for any micro cracks under optical microscope immediately after completely curing and after several days for any latent cracking. Coatings formed from Formulation 11 remained crack-free at up to 2.4 μm whereas those formed from Formulation 12 remained crack-free at up to 2.8 μm after curing at 400 C for 30 min.

The percent aryl and alkyl carbon in the formulations are provided in Table 1 below. Formulations 13 and 14 refer to Examples 12 and 13 below.

TABLE 1

Percent alkyl and aryl carbon

| Resin/Formulation | MTMOS mol. % | MTEOS mol. % | DMDEOS mol. % | PTEOS mol. % | Alkyl C % | Aryl C % |
|---|---|---|---|---|---|---|
| GR-950F | 0% | 0% | 0% | 100% | 0% | 100% |
| GR-150F | 0.00% | 49.85% | 0.30% | 49.85% | 14% | 86% |
| GR-100F | 0% | 70% | 0% | 30% | 28% | 72% |
| GR-630 | 0% | 30% | 40% | 30% | 38% | 62% |
| GR-650F | 0% | 100% | 0% | 0% | 100% | 0% |
| GR-654L | 100% | 0% | 0% | 0% | 100% | 0% |
| GR-908F | 0% | 25% | 0% | 75% | 5% | 95% |
| GR-950F + GR-150F 10/90 blend | 0% | 45% | 0% | 55% | 12% | 88% |
| GR-950F + GR-150F 50/50 blend | 0% | 25% | 0% | 75% | 5% | 95% |
| GR-950F + GR-650F 10/90 blend | 0% | 90% | 0% | 10% | 60% | 40% |
| GR-950F + GR-650F 50/50 blend | 0% | 50% | 0% | 50% | 14% | 86% |
| GR-150F + GR-650F 10/90 blend | 0% | 95% | 0% | 5% | 76% | 24% |
| GR-150F + GR-650F 50/50 blend | 0% | 75% | 0% | 25% | 33% | 67% |
| Polymer A | 0% | 0% | 0% | 100% | 0% | 100% |
| Polymer B | 0.00% | 49.75% | 0.50% | 49.75% | 15% | 85% |
| Comparative Formulation C | 0.00% | 49.85% | 0.30% | 49.85% | 14% | 86% |
| Formulation 1 | 0.00% | 44.78% | 0.45% | 54.78% | 12% | 88% |
| Formulation 2 | 0.00% | 47.26% | 0.48% | 52.26% | 13% | 87% |
| Formulation 3 | 0.00% | 42.29% | 0.43% | 57.29% | 11% | 89% |
| Formulation 4 | 0.00% | 24.88% | 0.25% | 74.88% | 5% | 95% |
| Formulation 5 | 0% | 45% | 0% | 55% | 12% | 88% |
| Formulation 6 | 0% | 40% | 0% | 60% | 10% | 90% |
| Formulation 7 | 0% | 25% | 0% | 75% | 5% | 95% |
| Formulation 8 | 0% | 47.5% | 5% | 47.5% | 17% | 83% |
| Formulation 9 | 0% | 45% | 10% | 45% | 19% | 81% |
| Formulation 10 | 0% | 42.5% | 15% | 42.5% | 22% | 78% |
| Formulation 11 | 0% | 48.5% | 0.5% | 51.0% | 14% | 86% |
| Formulation 12 | 0% | 47.1% | 0.8% | 52.1% | 13% | 87% |
| Formulation 13 | 0% | 100% | 0% | 0% | 100% | 0% |
| Formulation 14 | 0% | 100% | 0% | 0% | 100% | 0% |

As shown in Table 1, compositions having greater than 20% alkyl carbon were produced. Also as shown in Table 1, compositions having varying levels of difunctional siloxane content were produced.

Example 2

Effect of Blends of Polysiloxane Resins on Crack-free Film Thickness

Samples of Comparative Formulation C ("Comp. Form. C") and Formulation 5 ("Form. 5") as produced in Example 1 were deposited on a silicon substrate at various thicknesses as shown in Table 2 below. Duplicate samples were then cured at 380° C. for 30 minutes in a nitrogen atmosphere, followed by a second cure at 380° C. for 10 minutes in air. Following each cure, the film was inspected to determine whether the film had cracked. The results are provided in Table 2 below.

TABLE 2

Crack results - silicon substrate

| Material | Thickness (μm) | Cured 380° C. for 30 min in N2 | Cured 380° C. for 10 min in air |
|---|---|---|---|
| Comp. Form. C | 2.3 | No crack | No crack |
| Comp. Form. C | | | |
| Comp. Form. C | 2.7 | Cracked | Cracked |
| Comp. Form. C | | | |
| Comp. Form. C | 3.1 | Cracked | Cracked |
| Comp. Form. C | | | |
| Comp. Form. C | 3.5 | Cracked | Cracked |
| Comp. Form. C | | | |
| Form. 5 | 2.3 | No crack | No crack |
| Form. 5 | | | |
| Form. 5 | 2.7 | No crack | No crack |
| Form. 5 | | | |
| Form. 5 | 3.1 | No crack | No crack |
| Form. 5 | | | |
| Form. 5 | 3.5 | Marginal | Cracked |
| Form. 5 | | | |

As shown in Table 2, the comparative formulation C sample had a crack threshold on silicon about 2.3 μm. In contrast, the formulation 5 sample had a crack threshold of about 3.1 μm.

Samples of the comparative formulation C and formulation 5 as produced in Example 1 were next deposited on a copper/silicon nitride substrate at various thicknesses as shown in Table 3 below. Duplicate samples were then cured at 380° C. for 30 minutes in a nitrogen atmosphere followed by a second cure at 380° C. for 10 minutes in air. Following each cure, the film was inspected to determine whether the film had cracked. The results are provided in Table 3 below.

TABLE 3

Crack results - Copper/silicon nitride substrate

| Material | Thickness (μm) | Cured 380° C. for 30 min in N2 | Cured 380° C. for 10 min in air |
|---|---|---|---|
| Comp. Form. C | 2.3 | No crack | Cracked on particle |
| Comp. Form. C | | | |
| Comp. Form. C | 2.7 | Cracked | Cracked |
| Comp. Form. C | | | |
| Comp. Form. C | 3.1 | Cracked | Cracked |
| Comp. Form. C | | | |
| Comp. Form. C | 3.5 | Cracked | Cracked |
| Comp. Form. C | | | |
| Form. 5 | 2.3 | No crack | No crack |
| Form. 5 | | | |
| Form. 5 | 2.7 | No crack | Ok - Minor crack on glass defect |
| Form. 5 | | | |
| Form. 5 | 3.1 | Cracked | Cracked |
| Form. 5 | | | |
| Form. 5 | 3.5 | Cracked | Cracked |
| Form. 5 | | | |

As shown in Table 3, the comparative formulation C sample had a crack threshold on Cu/SiN about 2.3 μm. In contrast, the formulation 5 sample had a crack threshold less than 3.1 μm.

Next, a lower cure temperature of 350° C. was investigated. Samples of the comparative formulation C and formulation 5 as produced in Example 1 were next deposited on a silica or glass substrate at various thicknesses as shown in Table 4 below. Samples were cured at 350° C. for 1 hour in nitrogen at the thickness shown in Table 4 to form a film. Following curing, the film was visually inspected to determine whether the film had cracked. The results are provided in Table 4 below.

TABLE 4

Crack results - 350° C. cure temperature

| Sample | Substrate | Thickness (μm) | Result |
|---|---|---|---|
| Form. 5 | Si | 3.1 | No crack |
| Form. 5 | Si | 3.6 | Crack |
| Form. 5 | Glass | 2.6 | No crack |
| Form. 5 | Glass | 3 | No crack |
| Comp. Form. C | Si | 1.3 | Crack |

As shown in Table 4, reducing the cure temperature to 350° C. for formulation 5 resulted in no cracking as high as 3.1 μm on silicon and 3 μm on glass. In contrast, the comparative formulation C sample cracked at only 1.3 μm.

Formulation 5 films of 3.1 μm and 3.4 μm thickness were cured on silicon or glass as above and visually inspected for any latent cracking at 2, 7, 11, and 21 days after cure. The results are provided in Table 5.

TABLE 5

Crack results - over time

| Sample | Substrate | Thickness (μm) | 2 days after cure | 7 days after cure | 11 days after cure | 21 days after cure |
|---|---|---|---|---|---|---|
| Form. 5 | Si | 3.1 | No crack | No crack | No crack | No crack |
| Form. 5 | Si | 3.1 | No crack | No crack | No crack | No crack |
| Form. 5 | Si | 3.4 | No crack | No crack | No crack | No crack |
| Form. 5 | Si | 3.4 | No crack | No crack | No crack | No crack |
| Form. 5 | Glass | 3.1 | No crack | No crack | No crack | No crack |

TABLE 5-continued

Crack results - over time

| Sample | Substrate | Thickness (μm) | 2 days after cure | 7 days after cure | 11 days after cure | 21 days after cure |
|---|---|---|---|---|---|---|
| Form. 5 | Glass | 3.1 | No crack | No crack | No crack | No crack |
| Form. 5 | Glass | 3.4 | No crack | No crack | No crack | No crack |
| Form. 5 | Glass | 3.4 | No crack | No crack | No crack | No crack |

As shown in Table 5, formulation 5 did not crack over 21 days after cure at a thickness as high as 3.4 μm on either silicon or glass.

Similar examples of formulation 5 at about 3.6 μm were then cured at various temperatures in air. The results are provided in Table 6.

TABLE 6

Crack results - various temperatures in air

| Sample | Cure temperature | Thickness (μm) | Result |
|---|---|---|---|
| Form. 5 | 250° C. | 3.62 | No crack |
| Form. 5 | 275° C. | 3.61 | No crack |
| Form. 5 | 300° C. | 3.6 | Crack |
| Form. 5 | 150° C. | 3.6 | Crack |
| Form. 5 | 380° C. | 3.6 | Crack |

As shown in Table 6, reducing the temperature lead to no crack forming at temperatures below 300° C. even at a thickness as great as about 3.6 μm.

Samples of the comparative formulation C and formulation 5 as produced in Example 1 were deposited on a silicon or glass substrate at various thicknesses as shown in Table 7 below. Samples were then cured at 380° C. for 30 minutes in a nitrogen atmosphere, followed by a second identical cure. Following each cure, the film was inspected to determine whether the film had cracked. The results are provided in Table 7 below.

TABLE 7

Crack results

| Material | RPM | Thickness (Å) | Silicon- 1st cure | Silicon- 2nd cure | Glass- 2nd cure |
|---|---|---|---|---|---|
| Form. 5 | 1100 | 35389 | Crack | — | Crack |
| Form. 5 | 1300 | 32374 | Crack | — | Crack at Edge only |
| Form. 5 | 1500 | 30081 | Crack | — | No Crack |
| Form. 5 | 1500 | 29715 | No Crack | No Crack | No Crack |
| Form. 5 | 1200 | 33478 | No Crack | No Crack | No Crack |
| Form. 5 | 1000 | 37156 | No Crack | No Crack | No Crack |
| Form. 5 | 800 | 42216 | No Crack | No Crack | No Crack |

Samples of the comparative formulation C and formulations 5, 6, and 7 as produced in Example 1 were deposited on a silicon or glass substrate at various thicknesses as shown in Table 8 below. Samples were then cured at 350° C. for 60 minutes. Following curing, the film was visually inspected to determine whether the film had cracked. The results are provided in Table 8 below.

TABLE 8

Crack results

| Material | Substrate | RPM | Thickness (μm) | Result |
|---|---|---|---|---|
| Form. 7 | Silicon | 1500 | 3.08 | No crack |
| Form. 6 | Silicon | 1500 | 3.10 | No crack |
| Form. 5 | Silicon | 1500 | 3.09 | No crack |
| Comp. Form. C | Silicon | 1500 | 3.16 | Badly cracked |
| Form. 7 | Silicon | 1100 | 3.56 | No crack |
| Form. 6 | Silicon | 1100 | 3.55 | No crack |
| Form. 5 | Silicon | 1100 | 3.63 | Cracked |
| Comp. Form. 7 | Silicon | 1100 | 3.59 | Badly cracked |
| Form. 7 | Glass | 1500 | 2.6 | No crack |
| Form. 6 | Glass | 1500 | 2.6 | No crack |
| Form. 5 | Glass | 1500 | 2.6 | No crack |
| Comp. Form. C | Glass | 1500 | 2.6 | Badly cracked |
| Form. 7 | Glass | 1100 | 3 | No crack |
| Form. 6 | Glass | 1100 | 3 | No crack |
| Form. 5 | Glass | 1100 | 3 | No crack |
| Comp. Form. C | Glass | 1100 | 3 | Badly cracked |

As shown in Tables 7 and 8, the formulations 5, 6, and 7 had a higher crack threshold than the comparative formulation C film.

As shown in Example 2, the formulations 5, 6, and 7 were able to form films of substantially greater thickness than the comparative formulation C without cracking on various substrates and cured under different conditions. The formulation 5 films were stable at thickness up to 3 μm or greater at cure temperatures of 380° C., and up to 3.6 μm or greater at lower cure temperatures.

Example 3

Effect of Difunctional Siloxane Content on Crack-free Film Thickness

Samples of the control comparative formulation C and formulations 8, 9, and 10 as produced in Example 1 were deposited on a substrate at various thicknesses and cured in air as shown in Table 9 below. The crack threshold limit for each sample is provided in Table 9.

TABLE 9

Crack threshold limit

| Sample | Cure temperature | Cure time | Crack threshold limit (μm) |
|---|---|---|---|
| Comp. Form. C | 350° C. | 60 min | 1.3 |
| Form. 8 | 350° C. | 60 min | 2.4 |
| Form. 8 | 400° C. | 30 min | 2.4 |
| Form. 8 | 400° C. | 60 min | 2.06 |
| Form. 9 | 350° C. | 60 min | 2.5 |
| Form. 9 | 400° C. | 30 min | 2.5 |
| Form. 9 | 400° C. | 60 min | 2.24 |
| Form. 10 | 350° C. | 60 min | 3.15 |
| Form. 10 | 400° C. | 30 min | 3.15 |
| Form. 10 | 400° C. | 60 min | 2.6 |

As seen in Table 9, the crack threshold limit for each of formulations 8, 9, and 10 exceeded the 1.3 μm thickness for the comparative formulation C film.

As shown in Example 3, formulations 8, 9, and 10 were able to form films of substantially greater thickness than the comparative formulation C without cracking when cured under different conditions.

Example 4

Investigation of Film Optical Properties

A 6000 Å sample of the comparative formulation C and formulation 5 as produced in Example 1 were each deposited on a glass substrate and cured for 1 hour at 350° C. The results are provided in FIG. 1 and Table 10 below.

TABLE 10

Transmittance results - 350° C. in nitrogen

| Sample | Thickness (μm) | Cure atmosphere | % Absolute transmittance |
|---|---|---|---|
| Bare glass | Bare glass | None | 90.73 |
| Form. 5 | 3.1 | $N_2$ | 91.31 |
| Form. 5 | 3.1 | Air | 91.26 |
| Form. 5 | 3.4 | $N_2$ | 91.01 |
| Form. 5 | 3.4 | Air | 91.36 |
| Form. 5 | 3.1 | $N_2$ | 91.36 |
| Form. 5 | 3.1 | Air | 91.34 |
| Comp. Form. C | 1.1 | $N_2$ | 91.33 |
| Comp. Form. C | 1.1 | Air | 91.27 |

As shown in Table 10, both the comparative formulation C and formulation 5 had a higher transmittance than uncoated glass. In addition, the substantially thicker 3.1-3.4 μm samples of formulation 5 had similar transmittance to the relatively thin 1.1 μm samples of the comparative formulation C. The control comparative formulation C and formulation 5 films had similar transmittance results.

Figure 2A:
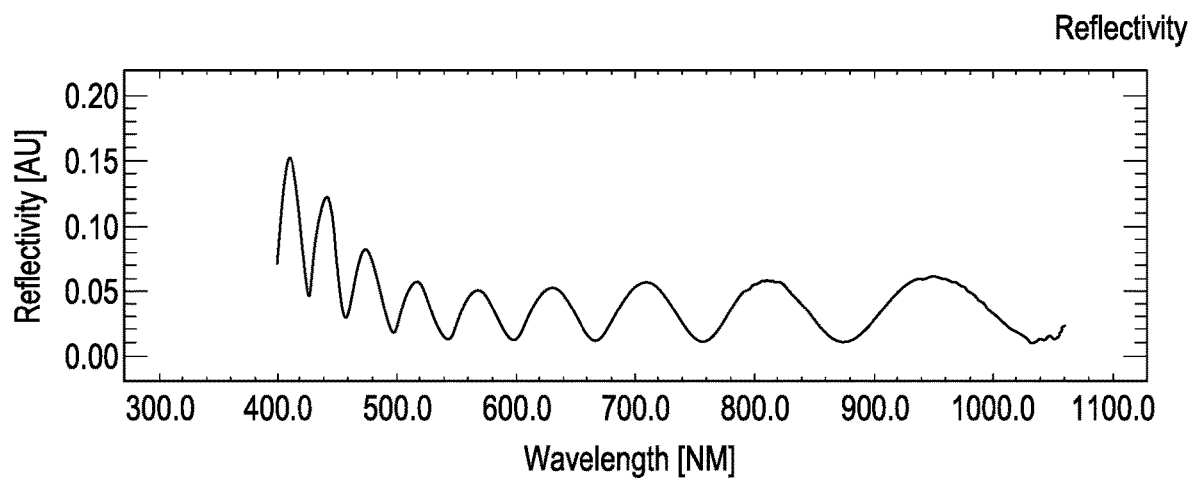
FIG. 2A is related to Example 4 and shows the reflectivity of the control coating at 400 nm to 1050 nm.
Figure 2B:
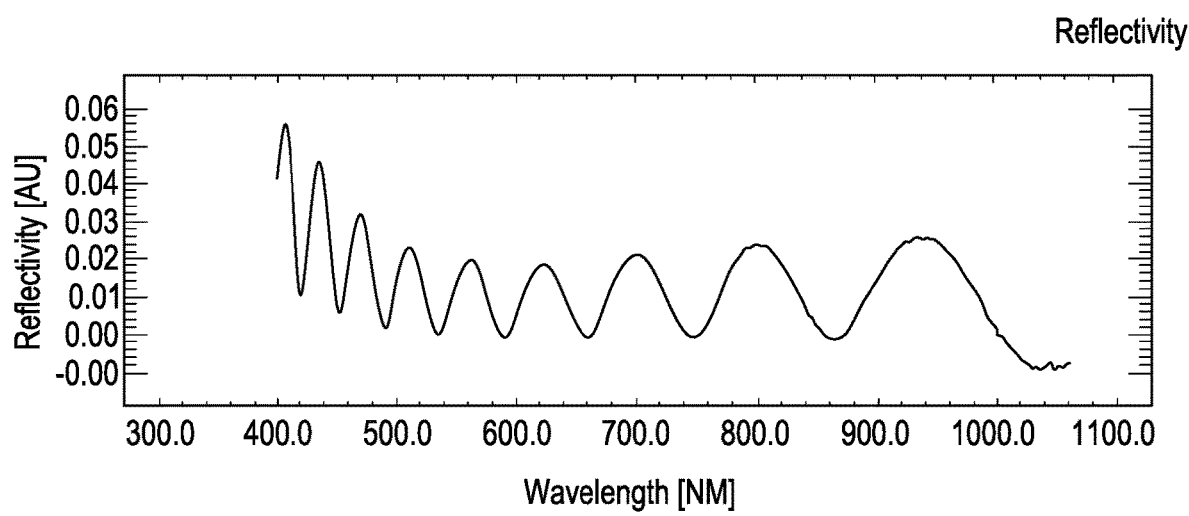
FIG. 2B is related to Example 4 and shows the reflectivity of an exemplary coating at 400 nm to 1050 nm.

A sample of the comparative formulation C and formulation 5 were deposited on a substrate, based at 230° C. for 30 minutes in air, followed by cure for 390° C. for 30 minutes in nitrogen. The reflectance from 400 nm to 1050 nm was determined. The results are provided for the comparative formulation C in FIG. 2A and formulation 5 in FIG. 2B. As can be seen in the figures, the coatings had almost identical reflectance profiles.

As shown in Example 4, the comparative formulation C and formulation 5 films had similar optical properties, which suggests that modifications by using resin blends and/or using higher content of dialkylsiloxane will not impact optical design considerations.

Example 5

Investigation of Formulation Viscosity

The viscosity of the comparative formulation C and formulation 5 formulations as produced in Example 1 was determined at 25° C. The results are provided in Table 1 below.

TABLE 11

Viscosity

| Sample | Thickness (Å) | Viscosity at 25° C. (cP) |
|---|---|---|
| Comp. Form. C | 6005 | 2.7 |
| Form. 5 | 6176 | 2.73 |
| Form. 8 | 6235 | 2.83 |

As shown in Table 11, each of the three formulations had similar viscosities, which suggests that modifications by using resin blends and/or using higher content of dialkylsiloxane will not impact processability of coating formulations by spin coating, spray coating, slot-die coating techniques.

Example 6

Investigation of Mechanical Properties

Figure 3A:
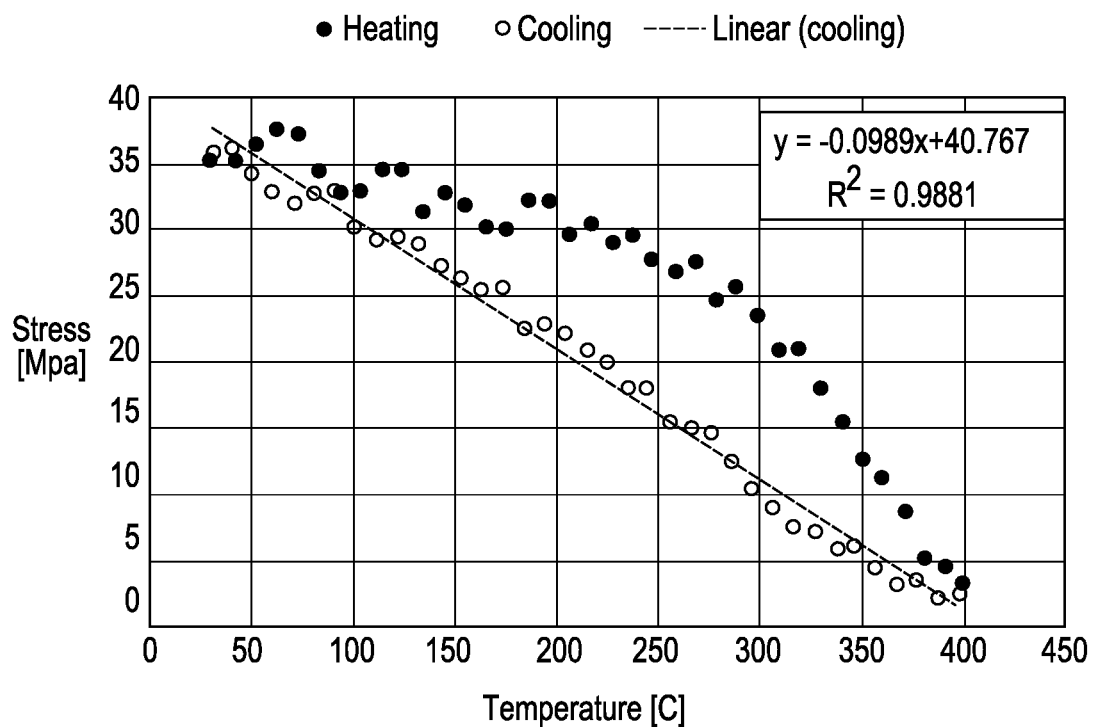
FIG. 3A is related to Example 6 and shows the residual stress in MPa for the control coating during a heating and cooling cycle.
Figure 3B:
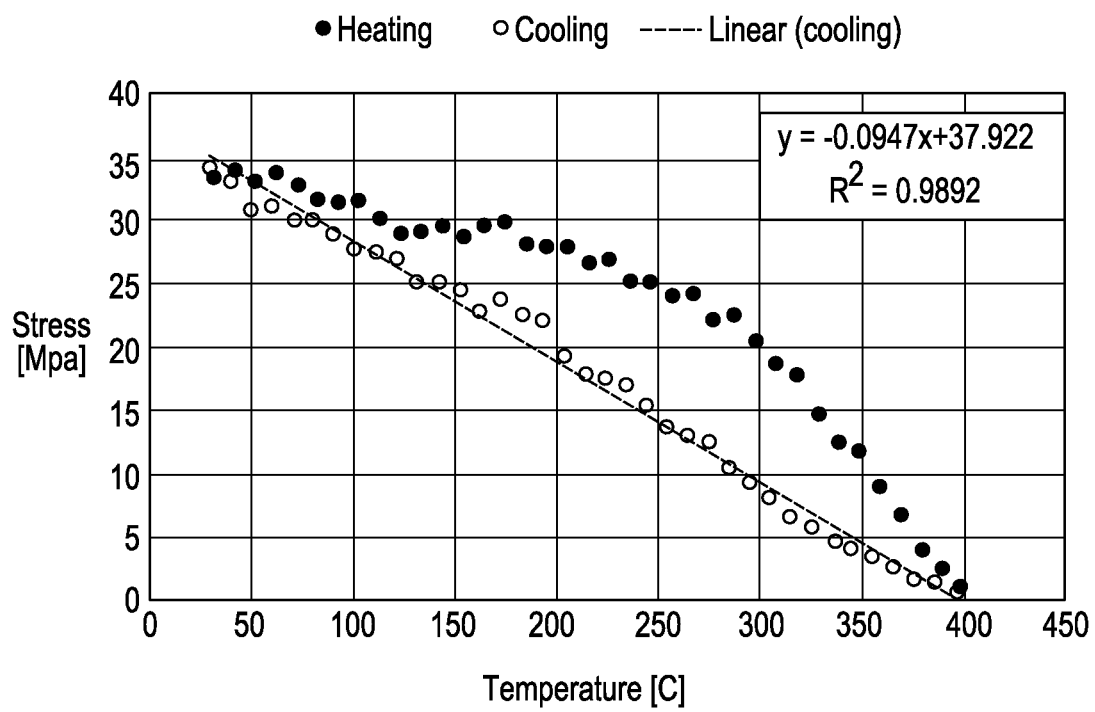
FIG. 3B is related to Example 6 and shows the residual stress in MPa for an exemplary coating during a heating and cooling cycle.

A sample of the comparative formulation C and formulation 5 formulations as produced in Example 1 were deposited on a substrate at 1.9 μm and cured at 390° C. for 30 minutes in nitrogen. The coatings were subjected to a heating and cooling cycle between room temperature and 400° C. The residual stress as a function of temperature for the comparative formulation C coating is provided in FIG. 3A and for the formulation 5 in FIG. 3B. A linear regression of the cooling line for each coating is also provided. As shown in FIG. 3, the slope of the cooling line for the formulation 5 coating (−0.0947 Mpa/° C.) is less than that for the comparative formulation C coating (−0.0989 Mpa/° C.). Without wishing to he held to any particular theory, it is believed that this contributes to the higher crack threshold of the formulation 5.

Figure 4A:
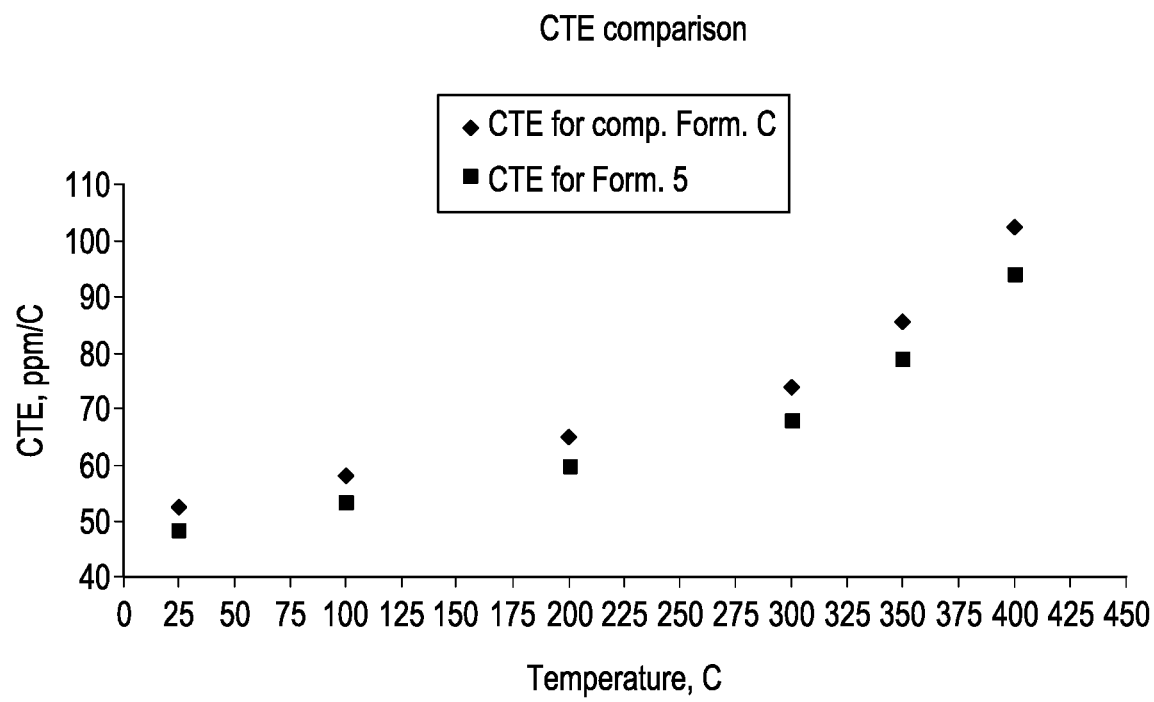
FIG. 4A is related to Example 6 and shows the coefficient of thermal expansion for the coatings as a function of temperature.
Figure 4B:
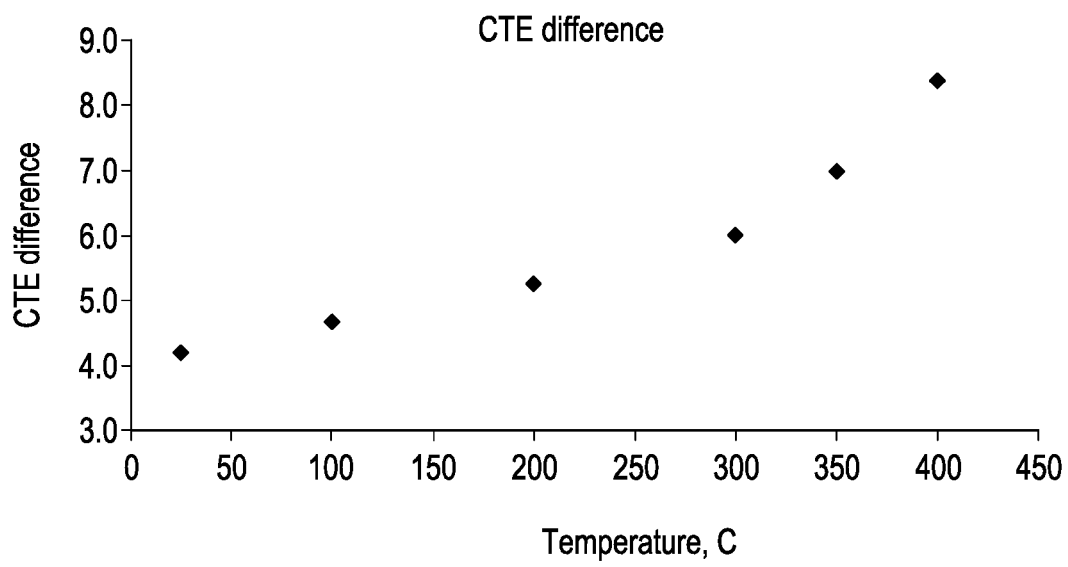
FIG. 4B is related to Example 6 and shows the difference in coefficient of thermal expansion for the coatings as a function of temperature.

The coefficient of thermal expansion (CTE) for the comparative formulation C and formulation 5 coatings at various temperatures is provided in Table 12 and FIGS. 4A and 4B.

TABLE 12

Coefficient of thermal expansion

| Temperature (° C.) | CTE for Comp. Form. C (ppm/° C.) | CTE for Form. 5 (ppm/° C.) | Difference (ppm/° C.) |
|---|---|---|---|
| Room temp. (Poisson 0) | 52.46 | 48.27 | 4.20 |
| 100 | 58.00 | 53.43 | 4.66 |
| 200 | 64.93 | 59.68 | 5.25 |
| 300 | 73.83 | 67.84 | 6.00 |
| 350 | 85.71 | 78.71 | 7.00 |
| 400 (Poisson 0.5) | 102.33 | 93.93 | 8.39 |

As shown in Table 12 and FIG. 4B, not only is the coefficient of thermal expansion for the formulation 5 coating lower than that of the comparative formulation C coating, the difference between the two values increases as the temperature increases. Without wishing to be held to any particular theory, it is believed that this contributes to the higher crack threshold of the formulation 5.

Example 7

Investigation of Film Thermal Stability

Figure 5:
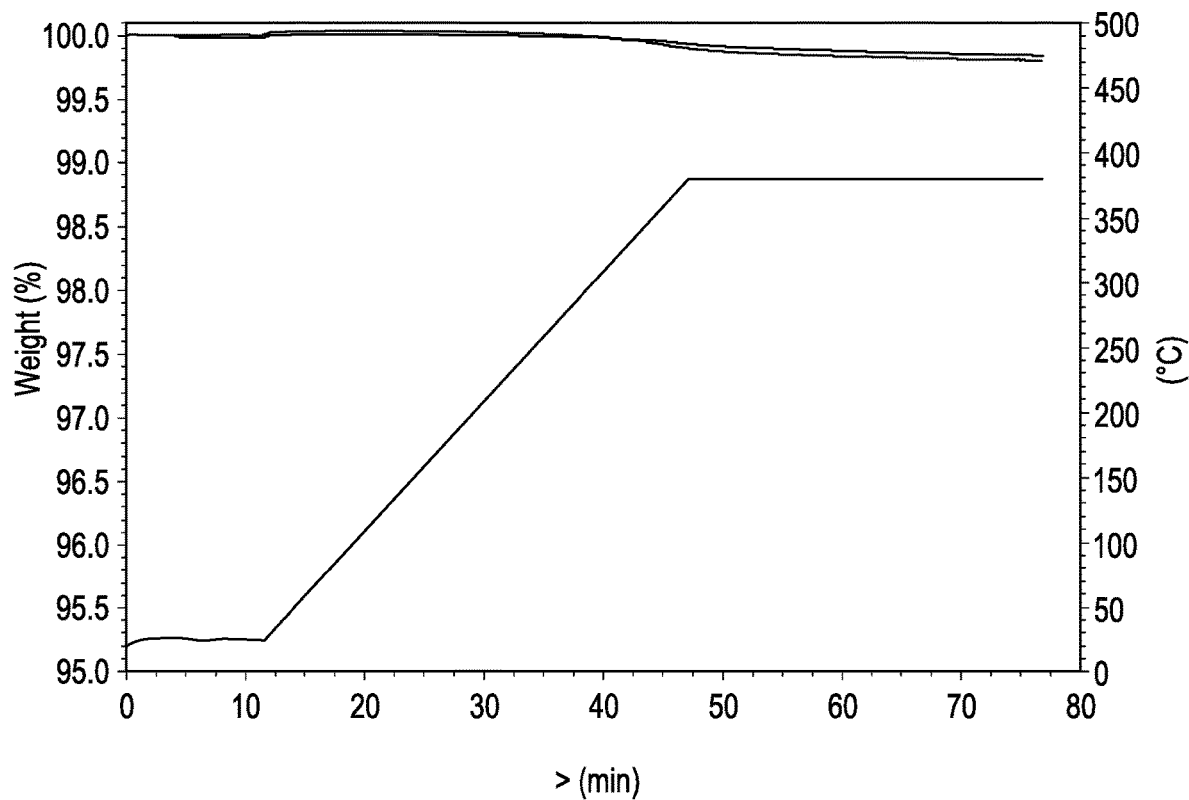
FIG. 5 is related to Example 7 and shows the thermal gravimetric analysis results for the coatings.

A sample of the comparative formulation C and formulation 5 formulations as produced in Example 1 were deposited on a substrate and cured for 30 minutes at 380° C. A thermal gravimetric analysis (TGA) was performed, heating the coating from room temperature to about 380° C. The results are presented in FIG. 5. As shown in FIG. 5, the coatings had almost identical TGA profiles.

Example 8

Investigation of Film Shrinkage

A sample of the comparative formulation C and formulation 5 formulations as produced in Example 1 were deposited on a substrate, baked for 30 minutes in air at 230° C., followed by curing for 1 hour in air at 380° C. The thickness of each coating was measured after the baking step and the curing step, and a percent shrinkage during the cure was determined. The results are provided in Table 13 below.

TABLE 13

| Coating shrinkage | | | |
|---|---|---|---|
| Sample | Thickness after bake (Å) | Thickness after cure (Å) | % Shrinkage |
| Comp. Form. C | 6005 | 5921 | 1.399 |
| Form. 5 | 6554 | 6451 | 1.572 |

As shown in Table 13, both coating exhibited similar shrinkage during the cure, which suggests that modifications by using resin blends and/or using higher content of dialkylsiloxane will not impact planarization performance.

As shown in Example 6-8, the comparative formulation C and formulation 5 formulations had similar properties, which suggests that modifications by using resin blends and/or using higher content of dialkylsiloxane will not impact outgassing performance during downstream thermal exposure.

Example 9

Investigation of Film Mechanical Resilience Properties

A sample of the comparative formulation C and formulation 5 formulations as produced in Example 1 were deposited on a substrate at 1.9 μm and cured at 390° C. for 30 minutes in nitrogen. Coating thickness was measured by ellipsometery using an N&K tool or a Nanometrics tool.

Figure 6A:
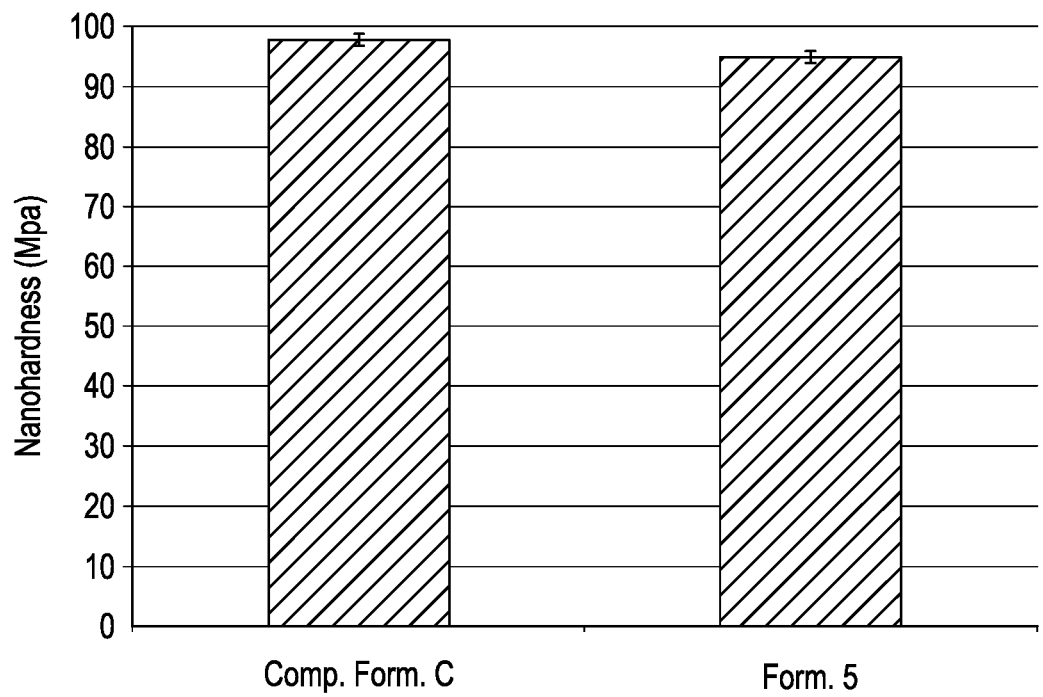
FIG. 6A is related to Example 9 and shows the nanohardness in MPa for the coatings.
Figure 6B:
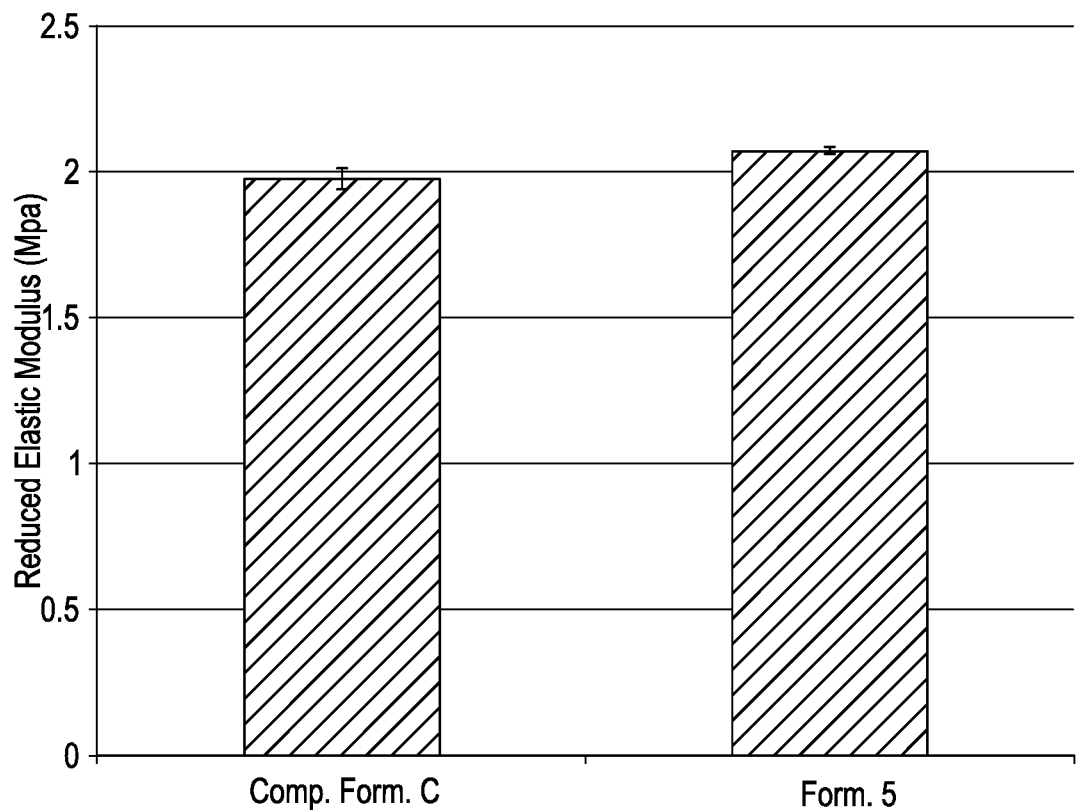
FIG. 6B is related to Example 9 and shows the Reduced Elastic Modulus in GPa for the coatings.

The hardness of the coatings is shown in FIG. 6A, and the modulus of the coatings is shown in FIG. 6B. As seen in FIGS. 6A and 6B, the hardness and modulus values are almost identical for the two coatings.

Figure 7B:
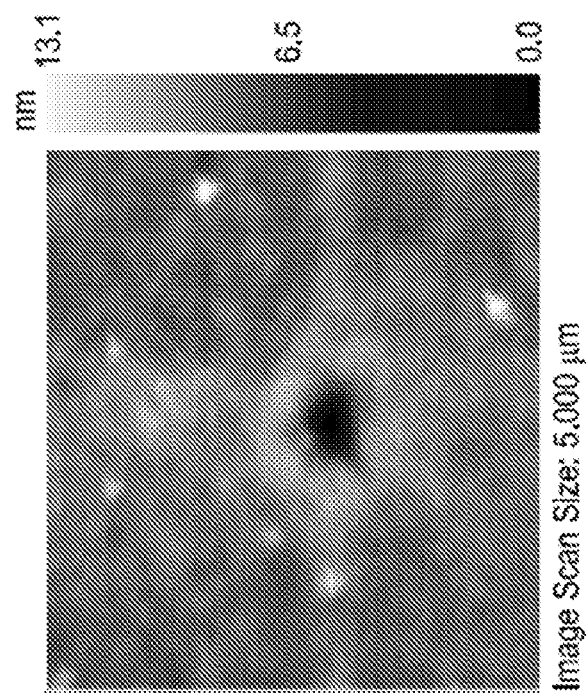
FIG. 7B is related to Example 9 and shows a scanning probe microscope image of the indentation for the control coating.
Figure 7A:
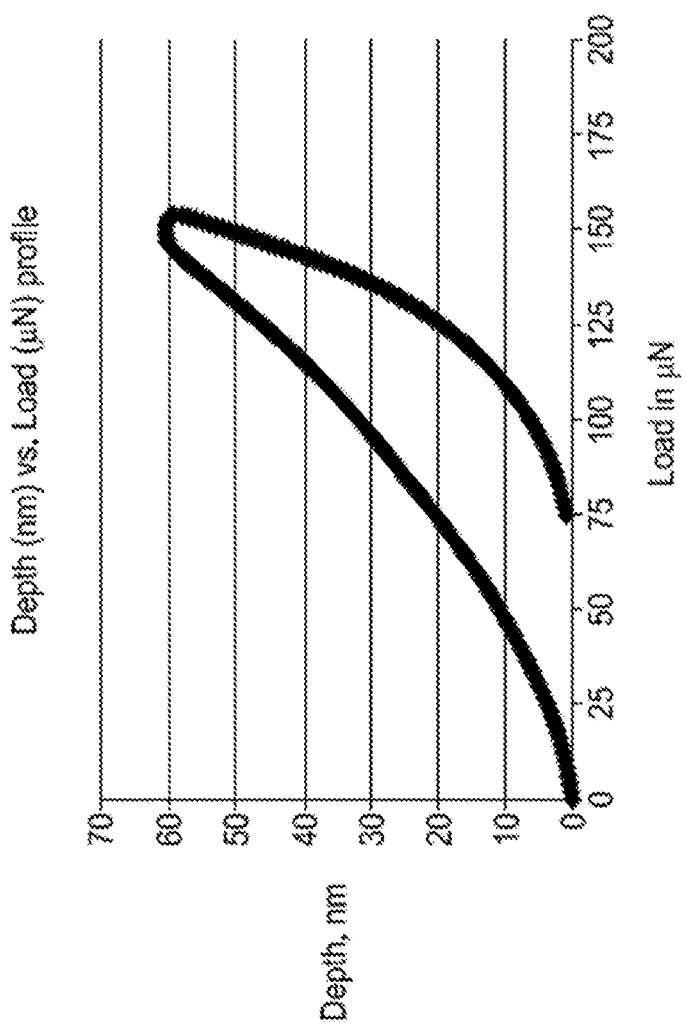
FIG. 7A is related to Example 9 and shows the depth vs. load profile for the control coating.

The profile of the depth in nm against load in μN for the comparative formulation C coating is provided in FIG. 7A and for the formulation 5 coating in FIG. 8A. A scanning probe microscope image of the indentation for the comparative formulation C coating is provided in FIG. 7B and for the formulation 5 coating in FIG. 8B. As seen in FIGS. 7 and 8, the profiles and indentations are nearly identical for the comparative formulation C and formulation 5 coatings.

Formulation 5 was deposited on a silicon substrate and cured for 1 hour at 350° C. in either nitrogen or air. A tape test was performed according to ASTM D3359-09E2, Standard Test methods for Measuring Adhesion by Tape Test to evaluate the adhesion of the coating to the base. The substrate was then heated to 85° C. and cooled in 15 minutes to −20° C. three times. After each cycle, the coating was checked for cracks. After the final cycle, the tape test was again performed. The results are provided in Table 14 below.

TABLE 14

| Adhesion results | | | | | | | |
|---|---|---|---|---|---|---|---|
| Sample | Thickness (μm) | Cure atm. | Tape test | After 1$^{st}$ cycle | After 2$^{nd}$ cycle | After 3$^{rd}$ cycle | Tape test |
| Form. 5 | 3.1 | $N_2$ | 0% peel off | No crack | No crack | No crack | 0% peel off |
| Form. 5 | 3.1 | Air | 0% peel off | No crack | No crack | No crack | 0% peel off |
| Form. 5 | 3.4 | $N_2$ | 0% peel off | No crack | No crack | No crack | 0% peel off |
| Form. 5 | 3.4 | Air | 0% peel off | No crack | No crack | No crack | 0% peel off |

As shown in Table 14, the formulation 5 coating had no cracking due to thermal cycling, and showed excellent adhesion both before and after the thermal cycling, which suggests that modifications by using resin blends and/or using higher content of dialkylsiloxane will not impact adhesion.

As shown in Example 9, the comparative formulation C and formulation 5 formulations had similar mechanical resilience, which suggests that modifications by using resin blends and/or using higher content of dialkylsiloxane will not impact mechanical resilience.

Example 10

Investigation of Film Chemical Resilience Properties

A sample of the comparative formulation C, formulation 5, and formulation 8 formulations as produced in Example 1 were deposited on a substrate and cured at 230° C. Each sample was exposed to either TOK-106 for 10 minutes at 70° C. or 2.38% TMAH for 10 minutes at room temperature. The results are provided in Table 15 below. Negative etch rates are the result of film swelling.

TABLE 15

| | | Chemical resistance | | |
|---|---|---|---|---|
| Sample | Solution | Thickness before (Å) | Thickness after (Å) | Etch rate (Å/min) |
| Comp. Form. C | TOK-106 | 6005 | 6007 | −0.2 |
| Form. 5 | TOK-106 | 6572 | 6581 | −0.9 |
| Form. 8 | TOK-106 | 7765 | 7773 | −0.8 |
| Comp. Form. C | TMAH | 6005 | 6007 | −0.2 |
| Form. 5 | TMAH | 6554 | 6548 | 0.6 |
| Form. 8 | TMAH | 7751 | 7740 | 1.1 |

As shown in Table 15, the three formulations have similar etch rates in TOK-106 and TMAH.

A sample of the formulation 5 formulation as produced in Example 1 was deposited on silicon and cured as indicated for 1 hour. The initial thickness was measured, followed by exposing the coating to NMP solution at 70° C. for 10 minutes. The coating was again measured, and an etch rate (Å/min) was determined. The coating was next exposed to Piranha solution, a 3:1 mixture of concentrated sulfuric acid and hydrogen peroxide, at 70° C. for 10 minutes. The coating was again measured, and an etch rate (Å/min) was determined. The coating was then exposed to 2.38% TMAH solution at room temperature for 10 minutes. The coating was again measured, and an etch rate (Å/min) was determined. The results of the wet etch testing are provided in Table 16 below. Negative etch values are due to film swelling.

TABLE 16

| | | Wet etch results | | | |
|---|---|---|---|---|---|
| Sample | Cure atm. | initial Thickness (Å) | NMP etch rate (Å/min) | Piranha etch rate (Å/min) | TMAH etch rate (Å/min) |
| Form. 5 | $N_2$ | 30870 | −89 | 23 | −8 |
| Form. 5 | Air | 31490 | 0 | 30 | 57 |
| Form. 5 | $N_2$ | 33719 | −90 | 3 | −6 |
| Form. 5 | Air | 33858 | −93 | −21 | 0 |

Next, a sample of the formulation 5 formulation as produced in Example 1 was deposited was deposited a substrate and cured in air. The coating was visually inspected with an optical microscope, an initial thickness was measured, along with an initial % transmittance, and the tape test to measure adhesion. The coating was then exposed to TOK-106 photoresist stripper at 70° C. for 10 minutes. The TOK-106 solution is an amine-based photoresist stripper comprising monoethanolamine and DMSO solvent available from Tokyo Ohka Kogyo America, Inc., Hillsboro, Oreg. The coating was again visually inspected under an optical microscope, the thickness was again measured, and an etch rate (Å/min) was determined. An after transmittance, tape adhesion, and OM inspection were performed. The results are provided in Table 17 below.

TABLE 17

| | | TOK-106 etch results | | | |
|---|---|---|---|---|---|
| Sample | Cure atm. | Initial Thickness (Å) | TOK-106 etch rate (Å/min) | Tape test area without/ area with TOK-106 | Visual inspection area without/ area with TOK-106 |
| Form. 5 | Air | 31175 | 3.7 | 0% peel off/ 0% peel off | Pass/Pass |

As shown in Tables 16 and 17, the formulation 5 coating was resistant for 10 minutes to NMP, Piranha, and TOK-106 at 70° C. and TMAH at room temperature, which suggests that modifications by using resin blends and/or using higher content of dialkylsiloxane will not impact chemical resilience As shown in Example 10, the comparative formulation C, formulation 5, and formulation 8 formulations have similar chemical resilience.

Example 11

Investigation of Film Plasma Etch Rates

Next, samples of the comparative formulation C and formulation 5 formulations as produced in Example 1 were deposited on a substrate, spun at the RPM listed in Table 18, baked at 230° C., followed by curing as shown in Table 13 below. The coating was then plasma etched at a power of 200 watts, 200 mTorr pressure, and 15 sccm $SF_6$, 20 sccm $O_2$ and 20 sccm Ar. The results are provided in Table 18 below.

TABLE 18

| | | etch results | |
|---|---|---|---|
| Sample | RPM | Cure | Average Etch Rate (nm/min) |
| Comp. Form. C | 2000 | 380° C. in $N_2$ | 248.9 |
| Form. 5 | 2000 | 380° C. in $N_2$ | 257.6 |
| Comp. Form. C | 1500 | No cure | 283.2 |

As shown in Table 18, formulation 5 had similar plasma etch rate to the comparative formulation C, which suggests that modifications by using resin blends and/or using higher content of dialkylsiloxane will not impact plasma etch rate.

Example 12

Formulations Free from External Water

Formulation 13, a polysiloxane resin GR-650F, derived from MTEOS, available from Techneglas Technical Products, Perrysburg, Ohio, was dissolved in PGMEA solvent at desired % solids loading and divided into two samples. To the first sample, a small amount of dilute aqueous TMAN solution was added. To the second sample, an equal amount of TMAN dissolved in PGPE solvent was added. Coating formulations were formed from each sample by adding PGMEA solvent and BYK surfactant. Each coating was spun on a substrate at 1000-1500 rpm to deposit films of desired thicknesses and cured under similar conditions. The refractive index (1.4) and adhesion performance by tape test (100% pass) were identical for the two coatings, which suggests that coating formulations can be formulated without using any external water without impacting optical or physical properties of coatings.

Example 13

Formulations Including an Adhesion Promoter

Formulation 14, a polysiloxane resin GR-650F, derived from MTEOS, available from Techneglas Technical Products, Perrysburg, Ohio, was dissolved in PGMEA solvent at desired % solids loading. A small amount of dilute aqueous TMAN solution, PGMEA solvent, BYK surfactant, and VTEOS were added. Coating was spun on a substrate at 1000-1500 rpm to deposit films of desired thicknesses and cured under similar conditions.

Example 14

Increase of Molecular Weight of Existing Polysiloxane Resins

Formulation 15—a 45 wt. % solution of a phenyl TEOS based polymer with a molecular weight of 1100 AMU in PGMEA was reacted in the presence of 250 ppm of the basic catalyst TBAH for 2 hours at 100° C. Following the reaction, the resulting resin had a molecular weight of 5000 AMU. Formulation 15 was spun on a silicon substrate and cured for 1 hour at 380° C. The resulting coating had a crack threshold greater than 4 µm.

Formulation 16—a mixture of Formulation 15 and a second polymer having a molecular weight of 4200 AMU and formed of about 50% phenyl TEOS and about 50% methyl TEOS was applied by slot die coating and cured on patterned thin film transistor (FTF) and interconnect dielectric substrate. The resulting coating was tested for planarization and chemical resistance. The coating was perfectly planarized, and had complete resistance to NMP (70° C. for 10 minutes), 2.38 wt. % TMAH (room temperature for 10 minutes), TOK-106 (70° C. for 10 minutes), DHF (room temperature for 5 minutes), and Piranha (70° C. for 10 minutes) solvents. Thermal gravimetric analysis at 350° C. for 4 hours (isothermal) determined that the coating had outgassing at or below 0.09 wt. %.

Formulation 17—a 45 wt. % solution of a phenyl TEOS based polymer with a molecular weight of 1100 AMU in PGMEA was reacted in the presence of 250 ppm of the basic catalyst TBAH for 2-3 hours at 70° C. Following the reaction, the resulting resin had a molecular weight of 2500 AMU. Formulation 15 was spun on a silicon substrate and cured for 1 hour at 380° C. The resulting coating had a crack threshold greater than 4 µm.

Formulation 18—a mixture of Formulation 17 and a second polymer having a molecular weight of 4200 AMU and formed of about 50% phenyl TEOS and about 50% methyl TEOS was applied by slot die coating and cured on patterned thin film transistor (FTF) and interconnect dielectric substrate. The resulting coating was tested for planarization and chemical resistance. The coating was perfectly planarized, and had complete resistance to NMP (70° C. for 10 minutes), 2.38 wt. % TMAH (room temperature for 10 minutes), TOK-106 (70° C. for 10 minutes), DHF (room temperature for 5 minutes), and Piranha (70° C. for 10 minutes) solvents.

Formulation 19—a 30 wt. % solution of a phenyl TEOS based polymer with a molecular weight of 1100 AMU in PGMEA was reacted in the presence of 200 ppm of the basic catalyst TBAH for 8 hours at 100° C. Following the reaction, the resulting resin had a molecular weight of 6000 AMU.

Formulation 20—a 30 wt. % solution of a phenyl TEOS based polymer with a molecular weight of 1100 AMU in PGMEA was reacted in the presence of 300 ppm of the basic catalyst TBAH for 8 hours at 100° C. Following the reaction, the resulting resin had a molecular weight of 8000 AMU.

Formulation 21—a 30 wt. % solution of a phenyl TEOS based polymer with a molecular weight of 1100 AMU in PGMEA was reacted in the presence of 400 ppm of the basic catalyst TBAH for 8 hours at 100° C. Following the reaction, the resulting resin gelled and precipitated out of solution.

Formulation 22—a 30 wt. % solution of a phenyl TEOS based polymer with a molecular weight of 1100 AMU and a second polymer having a molecular weight of 4200 AMU and formed of about 50% phenyl TEOS and about 50% methyl TEOS in PGMEA was reacted in the presence of 200 ppm of the basic catalyst TBAH for 8 hours at 100° C. Following the reaction, the resulting resin gelled and precipitated out of solution at room temperature.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:
1. A crosslinkable composition, comprising:
   a first polysiloxane resin comprising alkyl groups, wherein from 14% to 100% of the carbon atoms in the first polysiloxane resin are contained in the alkyl groups, the balance of carbon atoms contained in aryl groups, the first polysiloxane resin having a weight average molecular weight from 1000 AMU to 10,000 AMU;
   a second polysiloxane resin comprising aryl groups, wherein all of the carbon atoms in the second polysiloxane resin are contained in the aryl groups, the second polysiloxane resin having a weight average molecular weight from 900 AMU to 5000 AMU;
   at least one solvent; and
   at least one heat-activated catalyst.

2. The crosslinkable composition of claim 1, further comprising at least one surfactant.

3. The crosslinkable composition of claim 1, further comprising at least one adhesion promoter.

4. The crosslinkable composition of claim 1, wherein the first polysiloxane resin comprises methylsiloxane, phenylsiloxane, and dimethyldiethoxysilane, and the second polysiloxane resin comprises phenylsiloxane.

5. The crosslinkable composition of claim 1, wherein the first polysiloxane resin further comprises a difunctional siloxane.

6. The crosslinkable composition of claim 5, wherein the difunctional siloxane is dimethyl siloxane.

7. The crosslinkable composition of claim 5, wherein the difunctional siloxane comprises at least 0.1 mol.% as a percent of the total moles of siloxane in the first polysiloxane resin.

8. The crosslinkable composition of claim 1, wherein the percentage of carbon atoms contained in alkyl groups ranges from 5% to 12% based on the total number of carbon atoms in the first and second polysiloxane resins.

9. A crosslinked film formed from the crosslinkable composition of claim 1, wherein the crosslinked film has a thickness of 1.5 µm or greater.

10. The crosslinked film of claim 9, wherein the crosslinked film has a thickness of 3.0 µm or greater.

11. The crosslinked film of claim 9, wherein the crosslinked film is cured at a temperature of 350° C. or greater.

12. A device comprising a crosslinked film according to claim 9, wherein the device is selected from the group consisting of a transistor, a light-emitting diode, a color filter, a photovoltaic cell, a flat-panel display, a curved display, a touch-screen display, an x-ray detector, an active or passive matrix OLED display, an active matrix think film liquid crystal display, an electrophoretic display, a CMOS image sensor, and combinations thereof, and wherein the crosslinked film forms a passivation layer, a planarization layer, a barrier layer, or a combination thereof.

13. A method of forming a crosslinked film, the method comprising:

combining a first polysiloxane resin comprising alkyl groups, a second polysiloxane resin comprising aryl groups, a solvent, and a heat activated catalyst to form a crosslinkable composition, wherein from 14% to 100% of the carbon atoms in the first polysiloxane resin are contained in the alkyl groups, the balance of the carbon atoms contained in aryl groups, the first polysiloxane resin having a weight average molecular weight from 1000 AMU to 10,000 AMU, the second polysiloxane resin having a weight average molecular weight from 900 AMU to 5000 AMU, and all of the carbon atoms in the second polysiloxane resin are contained in the aryl groups;

depositing the composition on a substrate; and curing the crosslinkable composition at a temperature of 350° C. or greater to form a crosslinked film, wherein the crosslinked film has a thickness of 1.5 µm or greater.

14. The method of claim 13, wherein the first polysiloxane resin comprises methylsiloxane and phenylsiloxane and the second polysiloxane resin comprises phenylsiloxane.

15. The method of claim 14, wherein the first polysiloxane resin further comprises dimethyl siloxane.

16. The method of claim 13, wherein the crosslinked film has a thickness of 3.0 µm or greater.

17. The method of claim 13, wherein the crosslinked film is cured at a temperature of 350° C. or greater.

18. The method of claim 13, wherein the crosslinked film is cured at a temperature of 390° C. or greater.

19. The method of claim 13, wherein the first polysiloxane resin comprises methylsiloxane and phenylsiloxane and the second polysiloxane resin comprises phenylsiloxane, the method further comprising reacting a phenyl triethoxysilane-based polymer having a molecular weight of at least 1000 AMU in a solvent in the presence of a catalyst to form the second polysiloxane resin.

20. The method of claim 19, wherein the catalyst is a tetraorganoammonium compound.

* * * * *